United States Patent [19]

Merhav et al.

[11] Patent Number: 5,708,732
[45] Date of Patent: Jan. 13, 1998

[54] FAST DCT DOMAIN DOWNSAMPLING AND INVERSE MOTION COMPENSATION

[75] Inventors: Neri Merhav, Haifa, Israel; Vasudev Bhaskaran, Mountain View, Calif.

[73] Assignee: Hewlett-Packard Company, Palo Alto, Calif.

[21] Appl. No.: 611,922

[22] Filed: Mar. 6, 1996

[51] Int. Cl.[6] .......................... G06K 9/36; G06F 17/14; H04N 7/12
[52] U.S. Cl. .................. 382/232; 382/233; 382/246; 382/248; 382/250; 348/398; 348/399; 358/432; 358/433; 358/427; 364/725
[58] Field of Search ..................................... 382/232, 248, 382/250, 233, 234, 239; 358/261.3, 426, 427, 432, 433, 443, 445, 448; 348/398, 399; 341/65; 395/109, 115; 364/725

[56] References Cited

U.S. PATENT DOCUMENTS

| 5,168,375 | 12/1992 | Reisch et al. | 358/432 |
|---|---|---|---|
| 5,412,428 | 5/1995 | Tahara | 348/396 |

OTHER PUBLICATIONS

Lee, Ruby B. et al., "Achieving Realtime Software MPEG Decompression on a Multimedia-Enhanced PA-RISC Processor" Proceedings of the Hewlett-Packard Image and Data Compression Conference, May 10, 1994, Palo Alto, California pp. 1-9.

Merhav, Neri et al, "A Transform Domain Approach to Spatial Domain Image Scaling", HP Laboratories Technical Report, HPL-44-116, Dec. 1994, pp.1-14.

Arai, Yukihiro, et al., "A Fast DCT-SQ Scheme for Images", The Transactions of the IEICE, vol. E, No. 11, Nov. 1988, pp. 1095-1097, No. 17, Oct. 23, 1989, pp. 1727-1729.

Chang & Messerschmitt, "Manipulation and Compositing of MC-DCT Compressed Video", IEEE JSAC Special Issue on Intelligent Signal Processing, 1994.

Kou & Fjallbrant, "A Direct Computation of DCT Coefficients for a Signal Block Taken from Two Adjacent Blocks", IEEE Transactions on Signal Processing, vol. 39, No. 7, Jul. 1991.

Lee & Lee, "Transform Domain Filtering Based on Pipelining Structure", IEEE Transactions on Signal Processing, vol. 40, No. 8, Aug. 1992.

Lee et al., "Real-Time Software MPEG Video Decoder on Multimedia-Enhanced PA 7100LC Processors", Hewlett-Packard Journal, Apr. 1995.

LeGall, "MPEG: A Video Compression Standard for Multimedia Applications", Communications of the ACM, vol. 34, No. 4, Apr. 1991.

Primary Examiner—Edward L. Coles, Sr.
Assistant Examiner—Mark Wallerson

[57] ABSTRACT

Downsampling and inverse motion compensation are performed on compressed domain representations for video. By directly manipulating the compressed domain representation instead of the spatial domain representation, computational complexity is significantly reduced. For downsampling, the compressed stream is processed in the compressed (DCT) domain without explicit decompression and spatial domain downsampling so that the resulting compressed stream corresponds to a scaled down image, ensuring that the resulting compressed stream conforms to the standard syntax of 8×8 DCT matrices. For typical data sets, this approach of downsampling in the compressed domain results in computation savings around 80% compared with traditional spatial domain methods for downsampling from compressed data. For inverse motion compensation, motion compensated compressed video is converted into a sequence of DCT domain blocks corresponding to the spatial domain blocks in the current picture alone. By performing inverse motion compensation directly in the compressed domain, the reduction in computation complexity is around 68% compared with traditional spatial domain methods for inverse motion compensation from compressed data. The techniques for downsampling and inverse motion compensation can be used in a variety of applications, such as multipoint video conferencing and video editing.

30 Claims, 6 Drawing Sheets

FAST DCT DOMAIN DOWNSAMPLING AND INVERSE MOTION COMPENSATION

CROSS REFERENCE TO RELATED APPLICATIONS

The present patent application is related to copending application Ser. No. 08/612,513 (Attorney Docket No. 10950790-1), filed on Mar. 6, 1996 and entitled "A Fast and Apparatus for Filtering Compressed Images in the DCT Domain". The entire disclosure of that application is incorporated herein by reference.

BACKGROUND OF THE INVENTION

1. Technical Field

The invention relates to data compression. More particularly, the invention relates to performing such operations as downsampling and inverse motion compensation directly on compressed domain representations.

2. Description of the Prior Art

Many image and video processing applications require real time manipulation of digital image or video data to implement composition and special effects, e.g. downsampling (zooming in or out), modifying contrast and brightness, translating, filtering, masking, rotation, and inverse motion compensation. Real time manipulation of the image and video data may be problematic since in many instances the data is available only in compressed form. Typically, the image and video data may have been compressed according to one of the compression standards such as JPEG, MPEG-1, MPEG-2, H.261 or H.263 (hereinafter, collectively "compression standard" or equivalent).

The traditional approach to dealing with compressed domain data is to first decompress the data to obtain a spatial domain representation and then apply the desired image or video manipulation techniques for the desired composition or special effect and then compress the manipulated data so that the resulting bitstream conforms to the compression standard.

FIG. 1 is a flow chart of the traditional approach to manipulation of image data. Initially, an image is stored on a disk 112. The image is stored in a compressed format using one of any number of industry standard compression schemes in order to reduce the amount of memory space required to store the image. Many of these compression schemes use the so-called discrete cosine transform (DCT) to convert the original image data from the spatial domain to the compressed domain. The 8×8 2D-DCT transform converts a block $\{x(n,m)\}$ in the spatial domain into a corresponding matrix of frequency components $\{X(k,l)\}$ according to the following equation:

$$X(k,l) = \frac{c(k)}{2} \frac{c(l)}{2} \left[ \sum_{n=0}^{7} \sum_{m=0}^{7} x(n,m)\cos\left(\frac{(2n+1)k\pi}{16}\right) \cos\left(\frac{(2m+1)l\pi}{16}\right) \right]$$

where $c(0)=1/\sqrt{2}$ and $c(k)=1$ for $k>0$.

The conventional approach does not operate on the compressed data. Instead, the image data is transformed from the compressed domain back to the spatial domain in step 114. If the compression scheme uses the DCT, the decompression scheme uses the inverse DCT transform that is given by the following equation:

$$x(n,m) = \sum_{k=0}^{7} \sum_{l=0}^{7} \frac{c(k)}{2} \frac{c(l)}{2} X(k,l)\cos\left(\frac{(2n+1)k\pi}{16}\right) \cos\left(\frac{(2m+1)l\pi}{16}\right)$$

Once the data is returned to the spatial domain, conventional image manipulation techniques can be used in step 116 to produce a desired image. For inverse motion compensation, step 116 entails using conventional inverse motion compensation techniques. The processed data is then compressed again in step 118 using the same compression scheme and stored back to disk 120. Although disks 112 and 120 are shown separately, they can in fact be one and the same.

The traditional approach is cumbersome due to (1) the high computational complexity of the decompression and compression tasks, and (2) the large volume of spatial domain data that has to be manipulated. Thus traditional approaches may not be feasible in many practical applications.

For this reason there has been a great effort in recent years to develop fast algorithms that perform these tasks directly in the compressed domain and thereby avoid the need of decompression. See, for example S. F. Chang and D. G. Messerschmitt, *Manipulation and Compositing of MC-DCT Compressed Video*, IEEE journal on Selected Areas of Communications, Vol. 13, No. 1, pp. 1–11, 1994; S. F. Chang, D. G. Messerschmitt, *A New Approach to Decoding and Compositing Motion-Compensated DCT Based Images*, Proc. ICASSP '93, Minneapolis, April 1993; W. Kou, T. Fjalbrant, *A Direct Computation of DCT Coefficients for a Signal Block Taken from Two Adjacent Blocks*, IEEE Trans. Signal Proc., Vol. SP-39, pp. 1692–1695, July 1991; J. B. Lee, B. G. Lee, *Transform Domain Filtering Based on Pipelining Structure*, IEEE Trans. Signal Proc., Vol. SP-40, pp. 2061–2064, August 1992.

Video conferencing provides a suitable example for image manipulation. Consider a video conferencing session of several parties, where each party can see all other parties in separate windows on the screen of the party's workstation. It is desirable that every user have the flexibility to resize windows, move the windows from one location on the screen to another, and so on. Due to the limited computation capabilities within a workstation, it may be possible to efficiently handle only one video stream. In this scenario, it is still possible to have multiparty videoconferencing by having the video streams from all of the parties be first sent to a network server. The server composes the streams from all parties into a single stream.

The traditional approach requires that all compressed video streams are first decompressed at the server, then the desired change is translated into a suitable arithmetic operation on the decompressed video streams with the appropriate composition into a single stream, and finally, the composite stream is compressed again and sent to the user. Note that the video streams that are input to the server and the composite stream that is output by the server may have to conform to a compression standard. In standards compliant environments, a great deal of the computation load in the server is in the computation of the inverse discrete cosine transform (IDCT) during the decompression process and the computation of the DCT during the compression process.

Because a great deal of the computational load is in the DCT and IDCT operations, it would be advantageous to generate the composite stream directly in the DCT domain. It is therefore desireable to have a server in which the IDCT, stream composition and the DCT functions can be efficiently combined to yield the desired standards compliant single composite stream. Such a server would have the advantage of being less complex than a server that implements the traditional image stream composition. An additional advantage of such a server would be that this manner of stream composition would not put a heavy burden on user workstations because the user workstation now has to deal with only a single composite stream and thus needs to perform only a single decompression process. An added benefit is that the communications between the server and the user's workstation does not require very high communication bandwidth resources.

Another application which benefits from image manipulations in the compressed domain is an image kiosk and the delivery of images from the image kiosk to the home. Typically when a user connects to the image kiosk over a network, prior to obtaining the desired image, the user may want to browse through a catalog of images deliverable from the kiosk. For the purposes of image browsing, it may be adequate to provide the user a downsampled version of the image in compressed form, e.g. if the original image is of size 640 by 480 and is stored in the image kiosk according to the JPEG compression format, it may be sufficient to deliver to the user a JPEG compressed image which is the corresponding downsampling-by-two image of size 320 by 240. The problem that occurs when downsampling a compressed image conforming to the DCT domain based compression standards is that to yield another compressed image, it is necessary to take four compressed data blocks and produce a single compressed block, i.e. to achieve one-half resolution, it is necessary to reduce a set of compressed data blocks in both the horizontal (X) and in the vertical (Y) directions (two compressed data blocks x two compressed data blocks=four compressed data blocks). Similarly, when downsampling by three, it is necessary to combine nine compressed data blocks, i.e. three compressed data blocks each in the X and Y directions, to produce one scaled, compressed data block.

For those standards discussed above that rely upon DCT processing, one is constrained to an 8 by 8 DCT block geometry, such that the downsampled output must also be an 8 by 8 DCT block geometry so that the compressed bitstream can be decoded by any generic decompressor capable of handling JPEG, MPEG-1, MPEG-2, H.261 or H.263 compressed bitstream. Note that there are known methods for image downsampling given 8 by 8 DCT block geometry by simply performing a 4 by 4 IDCT to yield a downsampling-by-two image. This approach does not preserve the original 8 by 8 DCT format, although most industry standard hardware and software, for example for the JPEG, MPEG-1, MPEG-2, H.261 and H.263 standards, require that the data be maintained in the standard 8 by 8 DCT format. Thus, while such an approach does offer the capability of processing data directly in the compressed domain without converting the data back to an uncompressed form, those algorithms that have been developed for downsampling directly on compressed domain representations produce data outputs that are not compliant with industry standard hardware and software configurations.

A second problem, especially with regard to DCT-based data compression schemes, is concerned with the concept of inverse motion compensation. Video is best thought of as a sequence of pictures. With regard to compressed video, the first picture is typically considered an anchor picture that is processed with a compression scheme, such as defined by the MPEG standard. The second picture in the sequence exploits the fact that in video there is a strong correlation between successive pictures and therefore full information for the second picture is not needed. Rather, the compression scheme sends information that corresponds to the difference between the two pictures. The process of computing the difference is known as motion compensation, and the difference picture is typically referred to as a predictive picture or a motion compensated picture. Such a scheme achieves considerable data compression because it removes any information that is redundant over time.

The problem with such schemes occurs, for example when using a video editor. If the anchor picture is removed, then all subsequent pictures lose their context, because they were all dependent on the anchor picture. Therefore, it is not presently practical to perform video editing out of sequence, e.g. in the compressed domain. It is therefore necessary to take the compressed stream where the dependencies between each picture are contained in the bit stream, and then remove that dependency between the pictures. This process is known as inverse motion compensation. One way to remove this dependency is to completely decompress the bit stream, which yields each of the pictures, one after the other, such that they can be viewed as pictures. That is, each of the pictures is returned to its original state. The pictures now can be edited and then may have to be compressed again for storage or transmission. Unfortunately, the process of decompression followed by the desired editing function and re-compression is a very expensive proposition.

Thus, rather than performing image and video processing, such as downsampling and/or inverse motion compensation, in the uncompressed domain, it would be advantageous to perform such processing in the compressed domain by directly manipulating the DCT domain representation of the data.

SUMMARY OF THE INVENTION

The invention provides schemes that perform downsampling and inverse motion compensation on compressed domain representations. By directly manipulating the compressed domain representation instead of the spatial domain representation, the techniques disclosed herein significantly reduce computational complexity. Furthermore, because the invention provides techniques that performs the processing in the compressed domain, there is no loss of quality that would otherwise occur if the image were decompressed and then recompressed using a lossy algorithm, such as MPEG of JPEG.

In the case of downsampling, a method has been developed wherein the compressed stream is processed in the compressed (DCT) domain without explicit decompression and spatial domain downsampling so that the resulting compressed stream corresponds to a scaled down image. The method disclosed herein ensures that the resulting compressed stream conforms to the standard syntax of 8×8 DCT matrices. For typical data sets, this approach of downsampling in the compressed domain results in computation savings around 80% compared with traditional spatial domain methods for downsampling wherein the data is first decompressed and then downsampled in the spatial domain and then re-compressed again for storage or transmission.

In the case of inverse motion compensation, a method is disclosed to convert motion compensated compressed video into a sequence of DCT domain blocks corresponding to the spatial domain blocks in the current picture alone, i.e. each picture is represented as a sequence of DCT blocks that do not depend on data in other frames. By performing inverse motion compensation directly in the compressed domain, the reduction in computation complexity is around 68% compared with traditional spatial domain methods for inverse motion compensation from compressed data.

The functions of downsampling and inverse motion compensation can be used in a variety of applications such as multipoint video conferencing and video editing.

DETAILED DESCRIPTION OF THE INVENTION

Figure 1:
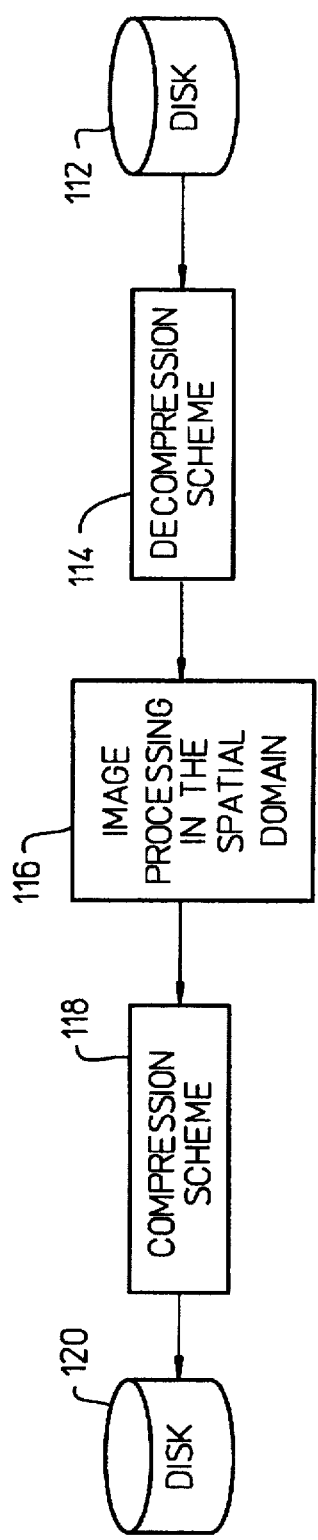
FIG. 1 is a flow chart of a prior art method of filtering image data in the spatial domain.

One aspect of the invention reduces the time required to perform such image processing operations as downsampling by factors, such as 2, 3, and 4, as compared to traditional approaches. As used herein, the term "downsampling-by-a-factor k" means that if the input image resolution is M×N pixels, then after downsampling, the resulting spatial domain image resolution is (M/k)×(N/k). Because the downsampling transformation is linear, the overall effect in the DCT domain is linear as well, and hence the basic operation can be represented as multiplication by a fixed matrix. Fast multiplication by this matrix is possible if it can be factorized into a product of sparse matrices whose entries are mostly 0, 1, and −1.

The invention provides a scheme that performs image processing in the compressed domain efficiently by taking advantage of the factorizations of the DCT and IDCT operation matrices that correspond to the fast 8-point DCT/ IDCT (see W. B. Pennebaker, J. L. Mitchell, *JPEG still Image Data Compression Standard*, Van Nostrand Reinhold, pp. 50–63, 1993).

The resulting schemes for downsampling save about 37% of the computations for a downsampling factor of two, 39% for a downsampling factor of three, and 50% for a downsampling factor of four. As used herein, the term "computation" corresponds to the basic arithmetic operations of a microprocessor, which are either shift, add, shift and add, shift-one and add (SH1ADD), shift-two and add (SH2ADD), and shift-three and add (SH3ADD). These savings are worst-case estimates because no assumptions have been made regarding sparseness in the DCT domain. Typically, in a considerably large percentage of the DCT blocks all of the DCT coefficients are zero except for the upper left 4×4 quadrant that corresponds to low frequencies in both vertical and horizontal directions. If this fact is taken into account, then computation reductions can reach about 80%.

Another advantage of the scheme herein disclosed is that it improves the precision of the computations when compared to traditional approaches. It has been found that the degree of improvement in precision varies between 1.5–3 dB. Thus, because the invention provides a technique that performs image processing in the compressed domain, there is no loss of image quality that would otherwise occur if the image were decompressed and then recompressed using a lossy algorithm, such as MPEG or JPEG, where each compression/decompression step intentionally and irrevocably discards a portion of the image to effect a high degree of compression.

Another embodiment of the invention provides a scheme that includes a fast algorithm for undoing the motion compensation operation in the DCT domain (see S. F. Chang and D. G. Messerschmitt, *Manipulation and Compositing of MC-DCT Compressed Video*, IEEE journal on Selected Areas of Communications, Vol. 13, No. 1, pp. 1–11, 1994; and S. F. Chang, D. G. Messerschmitt, *A New Approach to Decoding and Compositing Motion-Compensated DCT Based Images*,' Proc. ICASSP '93, Minneapolis, April 1993). The algorithm described herein receives as input DCT blocks of motion compensated compressed video, and provides DCT blocks of the corresponding spatial domain blocks of the current picture alone, without reference to past and future pictures. The operation of inverse motion compensation enables video compositing in the DCT compressed domain and also enables other video processing functions such as downsampling, overlapping, translation, and filtering.

One aspect of the invention further develops and improves on the scheme proposed by Chang and Messerschmitt, ibid, for inverse motion compensation. While in such scheme computations are saved only if the DCT blocks are sufficiently sparse, and only if a large fraction of the reference blocks are aligned to the boundaries between the original blocks at least in one direction, the scheme disclosed herein reduces the computational complexity by 47% compared to traditional approaches, even without any prior assumptions on sparseness or perfect alignment. If, in addition, DCT blocks are assumed sparse in the sense that only the top-left 4×4 subblocks are nonzero as is typically the case, then computational complexity is reduced by 68%.

In compressed domain downsampling, a key aspect of the invention is the following: given four DCT domain 8×8 sized blocks, the objective is to scale down the four blocks to yield a single 8×8 DCT block. The invention disclosed herein uses the frequency domain representation of the spatial domain operation and incorporates this representation in the DCT matrix factorization process.

In compressed domain inverse motion compensation, a key aspect of the invention is that given the DCT of the difference between blocks from two pictures, and the DCT of the block in one of the pictures, one needs to derive the DCT of the corresponding block in the second picture. Due to the fact that the blocks are not collocated in the two pictures, this computation is not trivial.

For image and video data compressed with the JPEG, MPEG, or Px64 compression method, the invention provides a technique that can downsample the image or video data with fewer operations than is needed if the downsampling function were implemented in the spatial domain. For inverse motion compensation, the method described herein leads to significant computation savings over equivalent spatial domain methods. The methods disclosed herein for downsampling and inverse motion compensation are well suited for efficient video editing systems and scalable multipoint video conferencing systems.

Image/video editor

Figure 2:
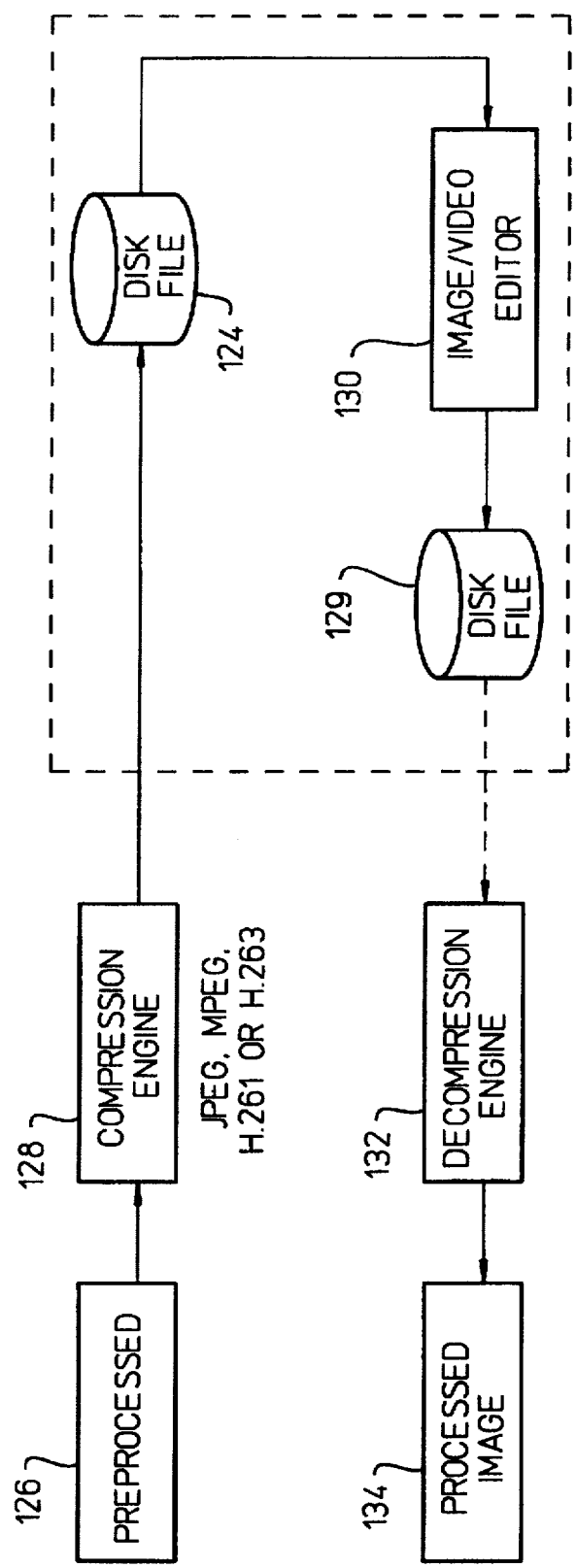
FIG. 2 is a system diagram for a generic image/video editor according to the invention.

Before turning to the details of image downsampling and inverse motion compensation according to the invention, a proposed system in which the one or both of these functions reside is shown in FIG. 2. The system includes a disk on which a preprocessed image 126 is stored in a file 124. The image 126 is compressed by a compression engine 128 according to one of the DCT-based compression schemes (e.g., JPEG, MPEG, H.261 or H.263). The image, for example, could be produced by a photoprocessing shop. The compressed image is then stored in a file 124 to allow the owner of the photograph to edit the photograph using an image/video editor 130. The image/video editor 130 includes image downsampling or inverse motion compensation functionality according to the invention that operates on the compressed image data stored in the file 124 to produce processed image data, which is also in the DCT domain, that is stored in another file 129 after processing. In an alternative embodiment, both downsampling and inverse motion compensation functionality reside in the image/video editor 130. The image/video editor 130 can include a plurality of predefined downsampling functions according to the invention and which allows the user to specify which one or more of these down sampling functions are desired. Although file 129 is shown on a separate disk from file 124, these disks need only be logically separate. In fact, both files 124 and 129 can be the stored on the same physical disk.

Once the compressed image has been edited by the image/video editor 130, the photoprocessing shop can then decompress the edited image with decompression engine 132 to produce a edited image 134, which can then be processed by the photoprocessing shop and sent to the owner.

Figure 3:
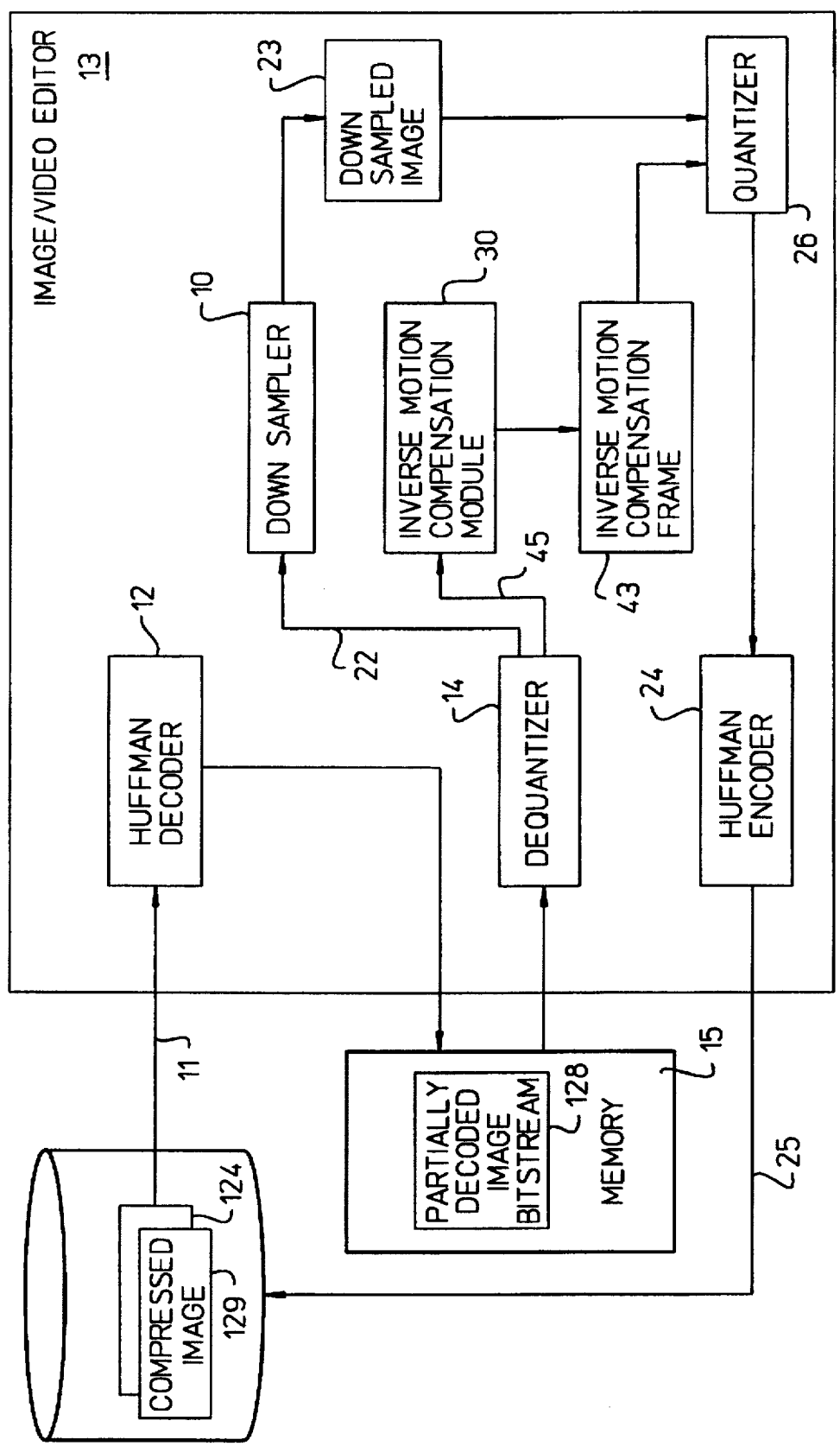
FIG. 3 is a block schematic diagram of a system for performing image and video processing in the compressed domain according to the invention.

FIG. 3 is a block schematic diagram of a system 100 for performing image and video processing in the compressed domain according to the invention. The image processing system 100 includes a disk drive 111, a memory 15, and an image/video editor 130. The image/video editor 130 may be a special purpose computer or a general purpose computer programmed to provide the image/video editor functions of the present invention.

The image/video editor 130 contains a Huffman decoder 12 for partially decoding compressed images. In the example of FIG. 3, a compressed image file 124 on disk drive 111 is input into the Huffman decoder 12 as a compressed bitstream 11. The compressed bitstream 11 is compressed in accordance with any known DCT-based compression scheme, such as MPEG, JPEG, H.261, or H.263. The Huffman decoder 12 writes to memory 15 a partially decoded image 128 which is subsequently provided to image/video editor 130.

The image/video editor 130 contains a dequantizer 14 which is connected to the memory 15 to receive partially decoded images 128. The dequantizer 14 contains functionality to generate 8×8 blocks in the DCT domain. These 8×8 DCT blocks are now amenable to DCT processing methods such as DCT domain downsampling, discussed below in conjunction with FIGS. 3, 4, and 5, and DCT domain inverse motion compensation, discussed below in conjunction with FIGS. 3, 6, and 7.

The core of the image/video editor 100 is formed of the downsampling unit 10 and the inverse motion compensation unit 30. Various alternative embodiments are possible containing either the down sampling unit 10 or the inverse motion compensation unit 30 or both (as shown in FIG. 3). Both the down sampling unit 10 and the inverse motion compensation unit 30 are connected to the dequantizer 14 to obtain dequantized image matrices.

The output from the down sampler 10 is a down sampled image 23 and for the inverse motion compensation module 30, an inverse motion compensation fram 43. These respective outputs are further processed by a quantizer 26 and by a Huffman encoder 24. The Huffman encoder 24 reverses the partial decoding performed by the Huffman decoder 12. Finally, the re-encoded image is transmitted back to its origin, e.g., as a processed compressed image file 129 on disk drive 111.

Downsampling in the Compressed Domain

Figure 4:
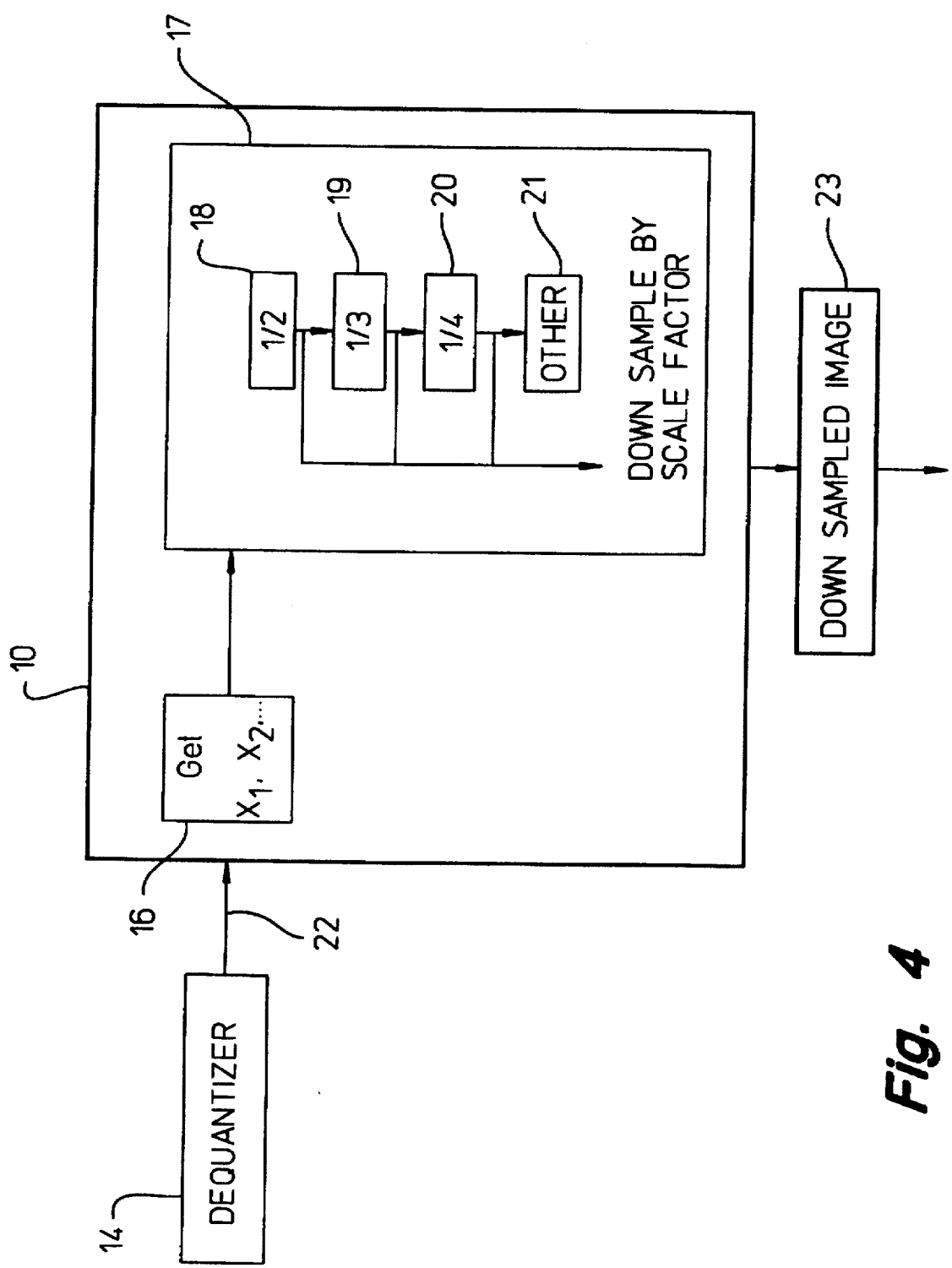
FIG. 4 is a block schematic diagram of the downsampling unit of the present invention.

FIG. 4 is a block schematic diagram of the downsampling unit 10 for performing downsampling in the compressed domain according to the invention. As discussed above, the dequantizer 14 obtains a partially decoded image 128 from the memory 15 and extracts therefrom a series of 8×8 DCT blocks 22 which are then provided to the down sampling unit 10.

As discussed in greater detail below, the 8×8 DCT blocks $X_1, X_2, \ldots$ from memory are processed with a determining means 16 to calculate a value X, based on a downsampling means 17 downsampling factor, which can provide any desired downsampling factor, such as a downsample by two factor 18 in which four 8×8 DCT blocks are combined to yield a single 8×8 DCT block, downsample by three factor 19 in which nine 8×8 DCT blocks are combined to yield a single 8×8 DCT block, downsample by four factor 20 in which sixteen 8×8 DCT blocks are combined to yield a single 8×8 DCT block, or other downsample factor 21. The downsampled image X 23 is then output for further processing or display/reproduction, as desired. For example, as shown in FIG. 3, image 23 may be provided to a Huffman encoder 24 to produces a compressed bitstream 25 output which ultimately is stored as a compressed image file 129 on a disk drive 111.

Uniquely, the scheme herein described combines at least four DCT blocks to accomplish downsampling in the compressed domain, while at the same time it provides an output DCT block that is the same size as each of the original blocks, i.e. four or more 8×8 DCT blocks are combined to produce a single 8×8 DCT block that is the average of the four or more blocks.

The 8×8 2D-DCT transforms a block $$\{x(n,m)\}_{n,m=0}^{7}$$

in the spatial domain into a matrix of frequency components $$\{X(k,l)\}_{k,l=0}^{7}$$

according to the following equation:

$$X(k,l) = \frac{c(k)}{2} \frac{c(l)}{2} \sum_{n=0}^{7} \sum_{m=0}^{7} x(n,m)\cos\left(\frac{2n+1}{16} k\pi\right)\cos\left(\frac{2m+1}{16} l\pi\right) \quad (1)$$

where $$c(0) = \frac{1}{\sqrt{2}}$$

and c (k)=1 for k>0. The inverse transform is given by:

$$x(n,m) = \sum_{k=0}^{7} \sum_{l=0}^{7} \frac{c(k)}{2} \frac{c(l)}{2} X(k,l) \cos\left(\frac{2n+1}{16} k\pi\right) \cos\left(\frac{2m+1}{16} l\pi\right) \quad (2)$$

In a matrix form, let $$x=\{x(n,m)\}_{n,m=0}^{7}$$

and $$X=\{X(k,l)\}_{k,l=0}^{7}$$

Define the 8-point DCT matrix $$S=\{s(k,n)\}_{k,n=0}^{7}$$

where $$s(k,n) = \frac{c(k)}{2} \cos\left(\frac{2n+1}{16} k\pi\right) \quad (3)$$

Then, $$X = S \times S^t \quad (4)$$

where the superscript t denotes matrix transposition. Similarly, let the superscript −t denote transposition of the inverse. Then, $$x = S^{-1} X S^{-t} = S^t X S \quad (5)$$

where the second equality follows from the unitarity of S.

Now, suppose there are four adjacent 8×8 spatial domain data blocks $x_1$, $x_2$, $x_3$, and $x_4$ that together form a 16×16 square, where $x_1$ corresponds to northwest, $x_2$ to northeast, $x_3$ to southwest, and $x_4$ to southeast. Downsampling (decimation) by a factor of two in each dimension means that every nonoverlapping group of four pixels forming a small 2×2 block is replaced by one pixel whose intensity is the average of the four original pixels. As a result, the original blocks $x_1, \ldots, x_4$ are replaced by a single 8×8 output block x corresponding to the downsampling of $x_1, \ldots, x_4$. Our task is to calculate efficiently X, the DCT of x, directly from the given DCT's of the original blocks $X_1$, $X_2$, $X_3$, and $X_4$.

The problems of downsampling down by a factor of 3 and 4 are defined similarly, where the number of input blocks is 9 and 16, respectively, and the blocks $x_1, x_2, \ldots$ are indexed in a raster scan order. Similarly, as in the case of a factor of 2, every nonoverlapping group of 3×3 pixels for the case of downsampling by 3, and 4×4 pixels for the case of downsampling by 4, are replaced by their average, and the output is one DCT block that is denoted always by X.

For the sake of simplicity, consider first the one dimensional case and downsampling by 2. The two dimensional case is a repeated application for every row and then for every column of each block. In this case, there are given two 8-dimensional vectors $X_1$ and $X_2$ of DCT coefficients corresponding to adjacent time domain vectors of length 8, $x_1 = S^{-1} X_1$ and $x_2 = S^{-1} X_2$, and it is necessary to calculate X, the DCT of the 8-dimensional vector x, whose each component is the average of the two appropriate adjacent components in $x_1$ or $x_2$.

It is convenient to describe the downsampling operation in a matrix form as follows.

$$x = \tfrac{1}{2}(Q_1 x_1 + Q_2 x_2) \quad (6)$$

where $$Q_1 = \begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

and $$Q_2 = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix}$$

Therefore, $$X = \tfrac{1}{2}(SQ_1 S^{-1} X_1 + SQ_2 S^{-1} X_2) \quad (7)$$

Consider next efficient factorizations of the matrices $U_1 = SQ_1 S^{-1}$ and $U_2 = SQ_2 S^{-1}$. To this end, a factorization of S is used that corresponds to the fastest existing algorithm for 8-point DCT. See W. B. Pennebaker, J. L. Mitchell, *JPEG Still Image Data Compression Standard*, Van Nostrand Reinhold, pp. 50–63, 1993. According to this factorization, S is represented as follows:

$$S = D P B_1 B_2 M A_1 A_2 A_3 \quad (8)$$

where D is a diagonal matrix given by:

$$D = \text{diag}\{0.3536, 0.2549, 0.2706, 0.3007, 0.3536, 0.4500, 0.6533, 1.2814\} \quad (9a)$$

P is a permutation matrix given by:

$$P = \begin{pmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \end{pmatrix} \quad (9b)$$

and the remaining matrices are defined as follows:

$$B_1 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & -1 & 0 & 0 & 1 \end{pmatrix} \quad (9c)$$

$$B_2 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 0 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & -1 & 0 & 1 \end{pmatrix} \quad (9d)$$

$$M = \begin{pmatrix} 1 & 0 & 0 & 0 & 0 & 0 & 0 & 0 \\ 0 & 1 & 0 & 0 & 0 & 0 & 0 & 0 \\ 0 & 0 & 0.7071 & 0 & 0 & 0 & 0 & 0 \\ 0 & 0 & 0 & 1 & 0 & 0 & 0 & 0 \\ 0 & 0 & 0 & 0 & -0.9239 & 0 & -0.3827 & 0 \\ 0 & 0 & 0 & 0 & 0 & 0.7071 & 0 & 0 \\ 0 & 0 & 0 & 0 & -0.3827 & 0 & 0.9239 & 0 \\ 0 & 0 & 0 & 0 & 0 & 0 & 0 & 1 \end{pmatrix} \quad (9e)$$

$$A_1 = \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix} \quad (9f)$$

$$A_2 = \begin{pmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & -1 & -1 & 0 & 0 \\ 0 & 0 & 0 & 0 & 0 & 1 & 1 & 0 \\ 0 & 0 & 0 & 0 & 0 & 0 & 1 & 1 \\ 0 & 0 & 0 & 0 & 0 & 0 & 0 & 1 \end{pmatrix} \quad (9g)$$

$$A_3 = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{pmatrix} \quad (9h)$$

Thus, for i=1,2 we have:

$$U_i = SQ_iS^{-1} = DPB_1B_2MA_1A_2A_3Q_iA_3^{-1}A_2^{-1}A_1^{-1}M^{-1}B_2^{-1}B_1^{-1}P^{-1}D^{-1} \quad (10)$$

The downsampling algorithm disclosed herein is based on the observation that the products $$F_iMA_1A_2A_3Q_iA_3^{-1}A_2^{-1}A_1^{-1}M^{-1} \; i=1,2 \quad (11)$$

are fairly sparse matrices, and most of the corresponding elements are the same, sometimes with a different sign. This means that their sum $F_+ = F_1 + F_2$ and their difference $F_- = F_1 - F_2$ are even sparser. These matrices are given as follows:

$$F_+ = \begin{pmatrix} 2 & 0 & 0 & 0 & 0 & 0 & 0 & 1 \\ 0 & 0 & 2.8285 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & -0.7071 & 0 & -1.7071 & 0 \\ 0 & 0 & 0 & 0 & 0 & 0 & 0 & 0 \\ 0 & 0 & 0 & 0 & 0.2929 & 0 & 0.7071 & 0 \\ 0 & 0 & 0 & 0 & -0.3827 & 0 & 0.9239 & 0 \end{pmatrix}$$

$$F_- = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0.7653 & 0 & 1.8477 & 0 \\ 0 & 0 & 0 & 0 & -0.7653 & 0 & 1.8477 & 0 \\ 0.5412 & 0 & 0 & 0 & 0 & 0 & 0 & 0 \\ 0.7071 & 0 & -1 & 0 & 0 & 0 & 0 & 0 \\ 1.3066 & 0 & 0 & 0 & 0 & 0 & 0 & 0 \\ 0.500 & 0 & 0.7071 & 0 & 0 & 0 & 0 & 0 \end{pmatrix}$$

Finally, using Equations 10 and 11, Equation 7 can be written as:

$$X = \frac{1}{2}(U_1X_1 + U_2X_2) = \frac{1}{4}[(U_1 + U_2)(X_1 + X_2) + \quad (12)$$
$$(U_1 - U_2)(X_1 - X_2)] = \frac{1}{4} DPB_1B_2[F_+B_2^{-1}B_1^{-1}P^{-1}D^{-1}$$
$$(X_1 + X_2) + F_-B_2^{-1}B_1^{-1}P^{-1}D^{-1}(X_1 - X_2)]$$

Next, count the number of basic arithmetic operations on a microprocessor that are needed to implement the rightmost side of Equation 12 and compare it to the spatial domain approach. As explained above, here the term operation corresponds to the elementary arithmetic computation of a typical microprocessor which is either shift, add, or shift and add, shift one and add (SH1ADD), shift two and add (SH2ADD), and shift three and add (SH3ADD). For example, the computation z=1.375×+1.125y is implemented as follows:

First, compute u=x+0.5x (SH1ADD), then v=x+0.25u (SH2ADD), afterwards w=v+y (ADD), and finally, z=w+ 0.125y (SH3ADD). Thus, overall four basic operations are needed.

When counting the operations, we use the fact that multiplications by D and $D^{-1}$ can be ignored because these can be absorbed in the dequantizer 14 and the quantizer 26, respectively. The matrices P and $P^{-1}$ cause only changes in the order of the components, so they can be ignored as well.

Thus, the following operations are left, where the number of additions/subtractions and the number of nontrivial multiplications are shown in parentheses:

Creating $X_1+X_2$ and $X_1-X_2$:16 operations (16 additions).
Two multiplications by $B_1^{-1}$: 8 operations (8 additions).
Two multiplications by $B_2^{-1}$: 8 operations (8 additions).
Multiplication by $F_+$: 23 operations (5 multiplications+5 additions). Multiplication by $F_-$: 28 operations (6 multiplications+4 additions). Adding the products: 8 operations (8 additions). Multiplication by $B_2$: 4 operations (4 additions).
Multiplication by $B_1$: 4 operations (4 additions). Total: 115 operations (11 multiplications+57 additions).

In the spatial domain approach, on the other hand, the following operations are required:

Two IDCT's: 114 operations (10 multiplications+60 additions).

Downsampling in time domain: 8 operations (8 additions).

DCT: 42 operations (5 multiplications+30 additions).
Total: 161 operations (15 multiplications+98 additions).

It turns out, as can be seen, that the herein disclosed scheme saves about 30% of the operations in the one-dimensional case. It is possible to obtain even greater reductions in complexity in the two-dimensional case.

As a byproduct of the herein disclosed scheme, should be noted that arithmetic precision is gained. Because in the direct approach, each one of the matrices is multiplied on right hand side of Equation 11 one at a time, then roundoff errors, associated with finite word length representations of the elements of these matrices, accumulate in each step. On the other hand, in the herein disclosed scheme, it is possible to precompute $F_i$ once and for all to any desired degree of precision, and then round off each element of these matrices to the allowed precision. The latter has better precision, as is discussed in greater detail below.

Consider now the two dimensional case. A 2-D DCT can be performed as a row-wise DCT operation. Row-wise DCT operation implies taking the 1-D DCT of each row of the spatial domain image block. Column-wise DCT operation implies taking the 1-D DCT of each column of the block resulting from the row-wise DCT operation. Therefore, the invention herein is readily applied to the two dimensional case as well. The following discussion describes in detail the computation schemes for downsampling by a factor of 2, 3, and 4.

Downsampling by 2

The two-dimensional extension of Equation 6 is:

$$x = \tfrac{1}{4}(Q_1 x_1 Q_1' + Q_1 x_2 Q_2' + Q_2 x_3 Q_1' + Q_2 x_4 Q_2') \qquad (13)$$

Note that x is the downscaled-by-two 8×8 block for the region covered by the 8×8 blocks $x_1$, $x_2$, $x_3$, and $x_4$.

The corresponding DCT domain extension of Equation 12 is $$X = \tfrac{1}{4}(U_1 X_1 U_1' + U_1 X_2 U_2' + U_2 X_3 U_1' + U_2 X_4 U_2') \qquad (14)$$

Therefore, the present invention computes X efficiently by directly manipulating the data in the DCT domain. The spatial domain approach requires explicitly performing the IDCT to compute $x_1$, $x_2$, $x_3$, and $x_4$ and then computing x using Equation 13 and subsequently taking the DCT of x to get X.

Again, it is desirable to express the right-hand side of Equation 14 in terms of $$U_+ = U_1 + U_2 = DPB_1 B_2 F_+ B_2^{-1} B_1^{-1} P^{-1} D^{-1}$$

and $$U_- = U_1 - U_2 = DPB_1 B_2 F_- B_2^{-1} B_1^{-1} P^{-1} D^{-1}.$$

To this end, define $$X_{+++} = X_1 + X_2 + X_3 + X_4, \qquad (15)$$

$$X_{+--} = X_1 + X_2 - X_3 - X_4, \qquad (16)$$

$$X_{-+-} = X_1 - X_2 + X_3 - X_4, \qquad (17)$$

and $$X_{--+} = X_1 - X_2 - X_3 + X_4. \qquad (18)$$

Note that to create all of the foregoing linear combinations, only 8 (and not 12) additions/subtractions are required per frequency component:

First compute $X_1 \pm X_2$ and $X_3 \pm X_4$ and then $(X_1 + X_2) \pm (X_3 + X_4)$ and $(X_1 - X_2) \pm (X_3 - X_4)$. Now, Equation 14 can be rewritten as:

$$\begin{aligned}
X &= \tfrac{1}{16}(U_+ X_{+++} U_-' + U_- X_{+--} U_+' + U_+ X_{-+-} U_-' + U_- X_{--+} U_+') \\
&= \tfrac{1}{16} DPB_1 B_2 \cdot \\
&\quad \left[ \begin{array}{l} (F_+ B_2^{-1} B_1^{-1} P^{-1} D^{-1} X_{+++} + F_- B_2^{-1} B_1^{-1} P^{-1} D^{-1} X_{+--}) D^{-t} P^{-t} B_1^t B_2^t F_+^t + \\ (F_+ B_2^{-1} B_1^{-1} P^{-1} D^{-1} X_{-+-} + F_- B_2^{-1} B_1^{-1} P^{-1} D^{-1} X_{--+}) D^{-t} P^{-t} B_1^t B_2^t F_-^t \end{array} \right] \\
&\quad B_2^t B_1^t P^t D^t.
\end{aligned} \qquad (19a)$$

If the number of operations associated with the implementation of the right-most side of Equation 19a are counted, the total is 2824 operations. The spatial-domain approach, on the other hand, requires 4512 operations. This means that 37.4% of the operations are saved using the inventive scheme disclosed herein.

Additional savings in computations can be made by taking advantage of the fact that in typical images most of the DCT blocks $X_i$ have only a few nonzero coefficients, which are normally the low frequency coefficients.

One approach to implementing this additional computational savings is to use a mechanism that operates in two steps. In the first step, DCT blocks are classified as being lowpass or non-lowpass, where the former are defined as blocks where only the upper left 4×4 subblock is nonzero. The second step uses either the computation scheme described above for non-lowpass blocks, or a faster scheme that uses the lowpass assumption for the precomputation of the above matrix multiplications. It turns out that if $X_1, \ldots, X_4$ are all lowpass blocks, then the reduction in computations is about 80%. This same approach is applicable to downsamplings by 3 and by 4 described below.

Figure 5:
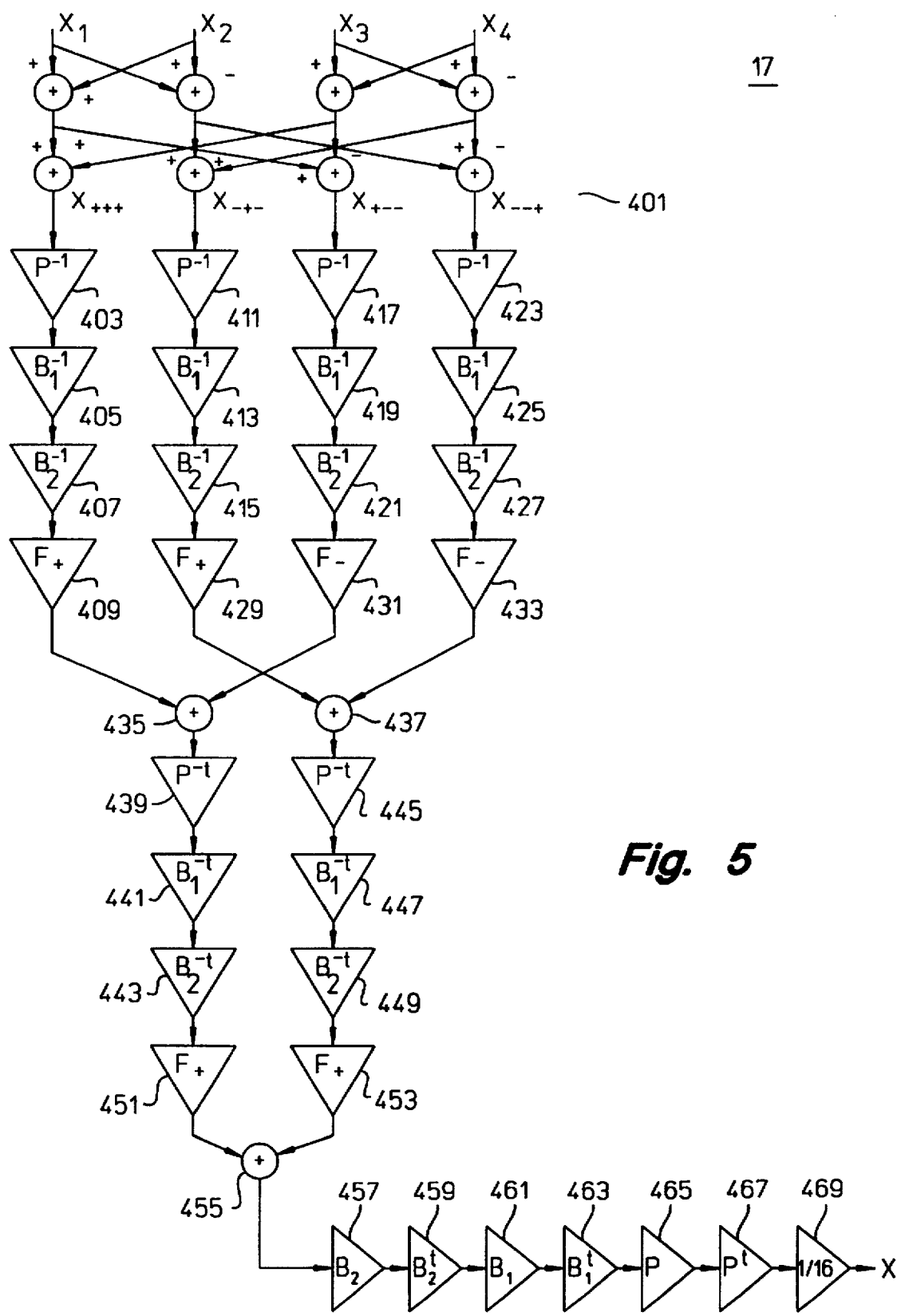
FIG. 5 is a block diagram of matrix arithmetic hardware for performing DCT based downsampling by a factor of two according to a preferred embodiment of the invention.

FIG. 5 is a schematic illustrating the downsampling by factor of two by downsampling means 17 of FIG. 4. In effect the circuitry of FIG. 5 is a practical application of Equation 19a in the art of digital image processing.

The matrices $X_1$, $X_2$, $X_3$, and $X_4$ are obtained from determining means 16 and input to a matrix addition network 401 to produce $X_{+++}$, $X_{+--}$, $X_{-+-}$, and $X_{--+}$. The matrix addition network 401 implements equations (15), (16), (17), and (18). $X_{+++}$ is multiplied to, and $F_+$ by multipliers 403, 405, 407, and 409, respectively. Similarly, $X_{+--}$, $X_{-+-}$, and $X_{--+}$ are each multiplied to $P^{-1}$, $B_1^{-1}$, and $B_2^{-1}$ by matrix multipliers 411 through 427, respectively. The result from matrix multiplier 415 is further multiplied to $F_+$ by matrix multiplier 429, and the results from multipliers 421 and 427 are multiplied to $F_-$ by matrix multipliers 431 and 433, respectively.

These various products produced by matrix addition network 401 and matrix multipliers 403 through 433 are added by matrix adders 435 and 437. The terms added by matrix adder 435 are the quantities $X_{+++} P^{-1} B_1^{-1} B_2^{-1} F_+$ and $X_{+--} P^{-1} B_1^{-1} B_2^{-1} F_-$. The terms added by matrix adder 437 are the quantities $X_{-+-} P^{-1} B_1^{-1} B_2^{-1} F_+$ and $X_{--+} P^{-1} B_1^{-1} B_2^{-1} F_-$ Each of the sums produced by matrix adders 435 and 437 are multiplied by the matrices $P^{-t}$, $B_1^{-t}$, $B_2^{-t}$ by matrix multipliers 435–449. The product produced by matrix multiplier 443 is then multiplied to matrix $F_+$ by matrix multiplier 451 and the product produced by matrix multiplier 449 is then multiplied to matrix $F_+$ by matrix multiplier 453. The resulting products from matrix multipliers 449 and 451 is then added by matrix adder 455. The resulting sum is:

$$(F_+B_2^{-1}B_1^{-1}P^{-1}X_{+++}+F\_B_2^{-1}B_1^{-1}P^{-1}X_{--})P^{-t}B_1^{-t}B_2^{-t}F_+{}'+(F_+B_2^{-1}B_1^{-1}P^{-1}X_{-++}+F\_B_2^{-1}B_1^{-1}P^{-1}X_{+-+})P^{-t}B_1^{-t}B_2^{-t}F_-{}' \quad (19b)$$

The dequantizer 14 and the quantizer 26 include the computations involving the matrixes $D$, $D^{-1}$, $D^t$, and $D^{t-1}$ of equation 19. Therefore, matrix multipliers are not needed, in the downsampling means 17, for multiplying those matrices.

The sum from equation (19b) is then multiplied to the remaining matrices of equation (19a), namely, matrices $B_2$, $B_2{}'$, $B_1$, $B_1{}'$, $P$, and $P^t$ by matrix multipliers 457 through 467 respectively. Finally, the resulting product is multiplied by the downsampling factor $1/16$ by multiplier 469.

Downsampling by 4

One approach for downsampling by 4, is to downsample twice by 2. However, it turns out that by using the same methods, a more efficient scheme for downsampling directly by 4 can be developed. Downsampling by 4, involves the following downsampling matrices:

$$Q_3 = \begin{pmatrix} 1 & 1 & 1 & 1 & 0 & 0 & 0 & 0 \\ 0 & 0 & 0 & 0 & 1 & 1 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

$$Q_4 = \begin{pmatrix} 0 & 0 & 0 & 0 & 0 & 0 & 0 & 0 \\ 0 & 0 & 0 & 0 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

$$Q_5 = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 1 & 1 & 0 & 0 & 0 & 0 \\ 0 & 0 & 0 & 0 & 1 & 1 & 1 & 1 \\ 0 & 0 & 0 & 0 & 0 & 0 & 0 & 0 \\ 0 & 0 & 0 & 0 & 0 & 0 & 0 & 0 \end{pmatrix}$$

$$Q_6 = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 1 & 1 & 0 & 0 & 0 & 0 \\ 0 & 0 & 0 & 0 & 1 & 1 & 1 & 1 \end{pmatrix}$$

and $$x = \frac{1}{16} \begin{pmatrix} Q_3 x_1 Q_3{}' + Q_3 x_2 Q_4{}' + Q_3 x_3 Q_5{}' + Q_3 x_4 Q_6{}' + \\ Q_4 x_5 Q_3{}' + Q_4 x_6 Q_4{}' + Q_4 x_7 Q_5{}' + Q_4 x_8 Q_6{}' + \\ Q_5 x_9 Q_3{}' + Q_5 x_{10} Q_4{}' + Q_5 x_{11} Q_5{}' + Q_5 x_{12} Q_6{}' + \\ Q_6 x_{13} Q_3{}' + Q_6 x_{14} Q_4{}' + Q_6 x_{15} Q_5{}' + Q_6 x_{16} Q_6{}' + \end{pmatrix} \quad (20)$$

Next, define:

$$H_1 = MA_1 A_2 A_3 Q_3 A_3^{-1} A_2^{-1} A_1^{-1} M^{-1} \quad (21)$$

$$H_2 = MA_1 A_2 A_3 Q_4 A_3^{-1} A_2^{-1} A_1^{-1} M^{-1} \quad (22)$$

$$H_3 = MA_1 A_2 A_3 Q_5 A_3^{-1} A_2^{-1} A_1^{-1} M^{-1} \quad (23)$$

$$H_4 = MA_1 A_2 A_3 Q_6 A_3^{-1} A_2^{-1} A_1^{-1} M^{-1} \quad (24)$$

and $$H_{+++} = H_1 + H_2 + H_3 + H_4 \quad (25)$$

$$H_{-+} = H_1 - H_2 - H_3 + H_4 \quad (26)$$

$$H_{+-} = H_1 - H_2 + H_3 - H_4 \quad (27)$$

$$H_{+--} = H_1 + H_2 - H_3 - H_4 \quad (28)$$

Also define the following linear combinations on the input data:

$$X_i^{+++} = X_i + X_{i+4} + X_{i+8} + X_{i+12} \quad (29)$$

$$X_i^{-++} = X_i - X_{i+4} - X_{i+8} + X_{i+12} \quad (30)$$

$$X_i^{-+-} = X_i - X_{i+4} + X_{i+8} - X_{i+12} \quad (31)$$

$$X_i^{+--} = X_i + X_{i+4} - X_{i+8} - X_{i+12} \quad (32)$$

where i=1,2,3,4.

$$X_{+++}{}^{+++} = X_1{}^{+++} + X_2{}^{+++} + X_3{}^{+++} + X_4{}^{+++} \quad (33)$$

$$X_{-++}{}^{+++} = X_1{}^{+++} - X_2{}^{+++} - X_3{}^{+++} + X_4{}^{+++} \quad (34)$$

$$X_{-+-}{}^{+++} = X_1{}^{+++} - X_2{}^{+++} + X_3{}^{+++} - X_4{}^{+++} \quad (35)$$

$$X_{+--}{}^{+++} = X_1{}^{+++} + X_2{}^{+++} - X_3{}^{+++} - X_4{}^{+++} \quad (36)$$

and similar definitions for the superscripts +−−, −+−, and −−+. To create all these combinations 64 additions/subtractions are required per frequency component. Now, similarly as in Equation 19a:

$$X = \frac{1}{256} DPB_1B_2 \cdot \begin{bmatrix} H_{+++}B_2^{-1}B_1^{-1}P^{-1}D^{-1} \cdot \\ \begin{pmatrix} X_{+++}^{+++}D^{-t}P^{-t}B_1^tB_2^tH'_{+++} + X_{+++}^{++-}D^{-t}P^{-t}B_1^tB_2^tH'_{+-} + \\ X_{+++}^{+-+}D^{-t}P^{-t}B_1^tB_2^tH'_{-+} + X_{+++}^{+--}D^{-t}P^{-t}B_1^tB_2^tH'_{--+} \end{pmatrix} + \\ H_{+-}B_2^{-1}B_1^{-1}P^{-1}D^{-1} \cdot \\ \begin{pmatrix} X_{+++}^{-++}D^{-t}P^{-t}B_1^tB_2^tH'_{+++} + X_{+-}^{-+-}D^{-t}P^{-t}B_1^tB_2^tH'_{+-} + \\ X_{+-}^{--+}D^{-t}P^{-t}B_1^tB_2^tH'_{-+} + X_{+-}^{---}D^{-t}P^{-t}B_1^tB_2^tH'_{--+} \end{pmatrix} + \\ H_{-+}B_2^{-1}B_1^{-1}P^{-1}D^{-1} \cdot \\ \begin{pmatrix} X_{-+}^{+++}D^{-t}P^{-t}B_1^tB_2^tH'_{+++} + X_{-+}^{++-}D^{-t}P^{-t}B_1^tB_2^tH'_{+-} + \\ X_{-+}^{+-+}D^{-t}P^{-t}B_1^tB_2^tH'_{-+} + X_{-+}^{+--}D^{-t}P^{-t}B_1^tB_2^tH'_{--+} \end{pmatrix} + \\ H_{--}B_2^{-1}B_1^{-1}P^{-1}D^{-1} \cdot \\ \begin{pmatrix} X_{--}^{-++}D^{-t}P^{-t}B_1^tB_2^tH'_{+++} + X_{--}^{-+-}D^{-t}P^{-t}B_1^tB_2^tH'_{+-} + \\ X_{--}^{--+}D^{-t}P^{-t}B_1^tB_2^tH'_{-+} + X_{--}^{---}D^{-t}P^{-t}B_1^tB_2^tH'_{--+} \end{pmatrix} \end{bmatrix} \cdot B_2^t B_1^t P^t D^t \quad (37)$$

The number of operations in implementing this formula is 8224 operations as compared to 16224 operations in the spatial-domain approach.

Equation 37 may be implemented using hardware matrix multipliers and adders in a similar fashion as described above in conjunction with FIG. 4.

Downsampling by 3

Downsampling by a factor of 3 is more problematic and less elegant than the factors of 2 and 4 because some of the 3×3 blocks to be averaged are not entirely within one 8×8 DCT block. In this case, there are three types of downsampling matrices:

$$Q_7 = \begin{pmatrix} 1 & 1 & 1 & 0 & 0 & 0 & 0 & 0 \\ 0 & 0 & 0 & 1 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

$$Q_8 = \begin{pmatrix} 0 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 1 & 1 & 1 & 0 & 0 & 0 & 0 \\ 0 & 0 & 0 & 0 & 1 & 1 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{pmatrix}$$

$$Q_9 = \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1 & 1 & 0 & 0 & 0 & 0 & 0 & 0 \\ 0 & 0 & 1 & 1 & 1 & 0 & 0 & 0 \\ 0 & 0 & 0 & 0 & 0 & 1 & 1 & 1 \end{pmatrix}$$

-continued and $$x = \frac{1}{9} \begin{pmatrix} Q_{7x1}Q_7{}^t + Q_{7x2}Q_8{}^t + Q_{7x3}Q_9{}^t + \\ Q_{8x4}Q_7{}^t + Q_{8x5}Q_8{}^t + Q_{8x6}Q_9{}^t + \\ Q_{9x7}Q_7{}^t + Q_{9x8}Q_8{}^t + Q_{9x9}Q_9{}^t + \end{pmatrix} \quad (38)$$

Similarly as in the cases of a factor of 2 and 4, define:

$$T_1 = MA_1A_2A_3Q_7A_3^{-1}A_2^{-1}A_1^{-1}M^{-1} \quad (39)$$

$$T_2 = MA_1A_2A_3Q_8A_3^{-1}A_2^{-1}A_1^{-1}M^{-1} \quad (40)$$

$$T_3 = MA_1A_2A_3Q_9A_3^{-1}A_2^{-1}A_1^{-1}M^{-1} \quad (41)$$

The computation scheme is based on the fact that the matrices:

$$T = T_1 + T_2 + T_3, \quad (42)$$

$$T_+ = T_1 + T_3, \quad (43)$$

$$T_- = (T_1 - T_3)/2 \quad (44)$$

are relatively sparse, and on the identity:

$$T_1X + T_2Y + T_3Z = TY + T_+\left(\frac{X+Z}{2} - Y\right) + T_-(X-Z). \quad (45)$$

If Equation 38 is transformed to the DCT domain and we express the fixed matrices in terms of T, $T_+$, and $T_-$, using Equation 45, after some algebraic manipulations, the following computation formula is obtained:

$$X = DPB_1B_2 \cdot \quad (46)$$

-continued $$\begin{bmatrix} TB_2^{-1}B_1^{-1}P^{-1}D^{-1} \\ (X_1'D^{-1}P^{-1}B_1'B_2'T + X_2'D^{-1}D^{-1}P^{-1}B_1'B_2'T_+' + \\ X_3'D^{-1}P^{-1}B_1'B_2'T_-') + \\ T_+B_2^{-1}B_1^{-1}P^{-1}D^{-1} \\ (X_4'D^{-1}P^{-1}B_1'B_2'T + X_5'D^{-1}P^{-1}B_1'B_2'T_+' + \\ X_6'D^{-1}P^{-1}B_1'B_2'T_-') + \\ T_-B_2^{-1}B_1^{-1}P^{-1}D^{-1} \\ (X_7'D^{-1}P^{-1}B_1'B_2'T + X_8'D^{-1}P^{-1}B_1'B_2'T_+' + \\ X_9'D^{-1}P^{-1}B_1'B_2'T_-') \end{bmatrix} B_2'B_1'P'D'$$

where, $$X_1' = X_5 \quad (47)$$

$$X_2' = \frac{1}{2}(X_4 + X_6) - X_5 \quad (48)$$

$$X_3' = X_4 - X_6 \quad (49)$$

$$X_4' = \frac{1}{2}(X_2 + X_8) - X_5 \quad (50)$$

$$X_5' = \frac{1}{2}\left[\left(\frac{X_1 + X_7}{2} - X_4\right) + \left(\frac{X_3 + X_9}{2} - X_6\right)\right] - X_4' \quad (51)$$

$$X_6' = \left(\frac{X_1 + X_7}{2} - X_4\right) - \left(\frac{X_3 + X_9}{2} - X_6\right) \quad (52)$$

$$X_7' = X_2 - X_8 \quad (53)$$

$$X_8' = \frac{1}{2}(X_1 - X_7 + X_3 - X_9) - X_7' \quad (54)$$

$$X_9' = X_1 - X_7 - X_3 + X_9 \quad (55)$$

The transformation from $\{X_1, \ldots, X_9\}$ to $\{X'_1, \ldots, X'_9\}$ can be performed in 18 operations per frequency component. The total number of operations associated with the implementation of Equation 46 is 5728 operations. On the other hand, the number of operations associated with the spatial domain approach is 9392 operations, i.e. the reduction in the number of computations is about 39%.

In one embodiment the downsampling by 3 method described above is implemented using matrix multipliers and matrix adders in a similar fashion as described above in conjunction with FIG. 4 for the case of downsampling by 2.

The herein disclosed computation scheme provides better arithmetic accuracy than the standard approach. To demonstrate this fact, the inventors have tested both schemes for the case of downsampling by 2, where each element in each of the above defined fixed matrices is represented by 8 bits.

In the first experiment, the elements of $x_1, \ldots, x_4$ have been chosen as statistically independent random integers uniformly distributed in the set $\{0,1, \ldots, 255\}$. First compute x, and then X, directly from $x_1, \ldots, x_4$ for reference. Then compute the DCT's $X_1, \ldots, X_4$ where all DCT coefficients are quantized and then dequantized according to a given quantization matrix $\Delta$. From $X_1, \ldots, X_4$, compute X using both the standard approach and the herein disclosed scheme, and compare the results to the reference version, where the precision in each approach is measured in terms of the sum of squares of errors (MSE) in the DCT domain, and hence also in the spatial domain. For the case where $\Delta$ is an all-one matrix, the MSE of the herein disclosed scheme is about 3 dB better than that of the standard approach. For the case where $\Delta$ is the recommended quantization matrix of JPEG for luminance (see W. B. Pennebaker, J. L. Mitchell, *JPEG still Image Data Compression Standard*, Van Nostrand Reinhold, 1993), the herein disclosed scheme outperforms the standard approach by 1.2 dB. These results are reasonable because when the step sizes of the quantizer increase, quantization errors associated with the DCT coefficients tend to dominate roundoff errors associated with inaccurate computations.

The second experiment is similar, but the test data that is based on a real image rather than random data. For the case where $\Delta$ is an all-one matrix, the standard approach yields SNR of 46.08 dB, while the herein disclosed scheme yields 49.24 dB, which is again a 3 dB improvement. For the case where $\Delta$ is the JPEG default quantizer, the figures are 36.63 dB and 36.84 dB, respectively. Here, the degree of improvement is less than in the case of random data because most of the DCT coefficients are rounded to zero in both techniques.

Inverse Motion Compensation

Figure 6:
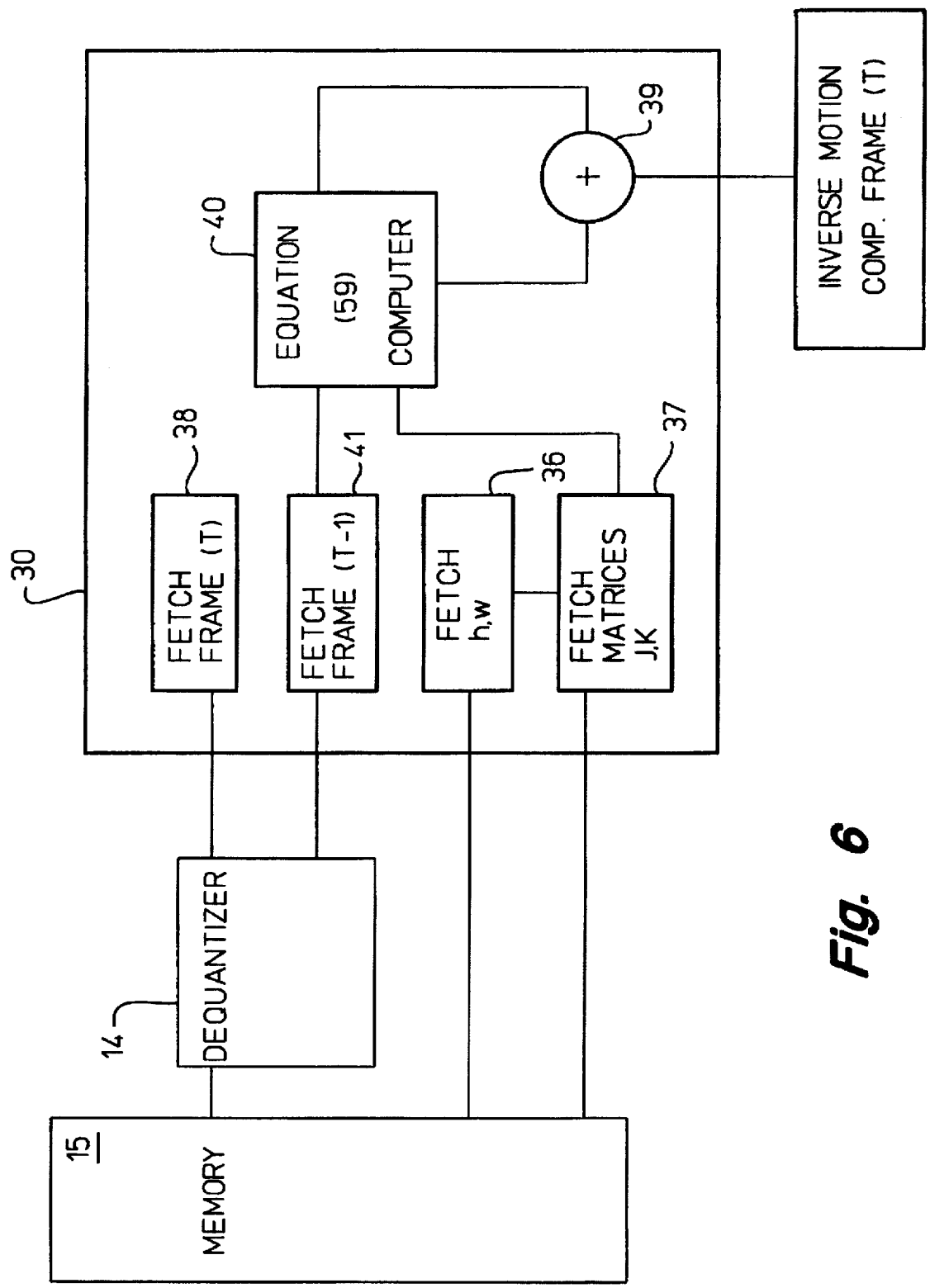
FIG. 6 is a block schematic diagram of an inverse compensation unit of the present invention.

FIG. 6 is a block schematic diagram of an alternative view of the inverse motion compensation unit 10 for performing inverse motion compensation in the compressed domain of image/video editor 130 according to the invention. As shown in FIG. 3, the image/video editor 130 may contain an down sampling unit 10. As discussed above in conjunction with FIG. 3, a compressed bit stream 128 from disk 124, is partially decoded by a Huffman decoder 12. The bitstream is compressed in accordance with any known DCT-based video compression scheme, such as MPEG or H.261. The partially decompressed bitstream 128 is dequantized by dequantizer 14.

The dequantizer 14 is connected to the inverse motion compensation unit 30. A picture fetching module 41 of the inverse motion compensation unit 30 extracts from the dequantized and partially decompressed bitstream data $X_1$, $X_2, \ldots$, in the form of a DCT 8×8 block which corresponds to the present picture (at time T), and to a motion vector h,w, which corresponds to the difference between an anchor picture (at time T−1) and the present picture (T). The DCT block and motion vector information are then provided to a processing unit 40, which in effect executes the calculation of Equation 59 (discussed below).

As discussed in greater detail below, the 8×8 DCT block is processed to locate a desired region within the anchor picture T−1, such that up to four 8×8 DCT blocks are combined to yield a single 8×8 DCT block. A module 36 in the processor fetches h,w from the memory 15, while another module 41 fetches the four 8×8 DCT blocks, $X_1, X_2$, $X_3, X_4$, which comprise the picture (T−1). Another module 37 uses h and w to fetch the required J, K matrices and thereby precalculate a set of fixed matrices, while another module 38 fetches an 8×8 DCT block that corresponds to the present picture (T) from the memory. Once the proper region of the anchor picture (T−1) is located, the four 8×8 DCT blocks that comprise the information necessary to establish the anchor picture (T−1) are converted to a single 8×8 DCT block by a processing unit 40 for carrying out the inverse motion compensation calculation (e.g., Equation 59 below), and the block thus determined is combined with an 8×8 DCT block that represents the difference between the anchor picture T−1 and the present picture T by an adder 39 in the processor to produce an independent image. The inverse motion compensated DCT block 43 is then output to the quantizer 26 and subsequently to the Huffman encoder 24 to produce an output 25 that may be stored on the disk drive 111, as shown in FIG. 3.

Motion compensation of compressed video means predicting each 8×8 spatial domain block x of the current picture by a corresponding reference block x̂ from a previous picture and encoding the resulting prediction error block e=x−x̂ by using the DCT (see Equation 1 to 5 above). In some of the pictures (e.g. B-pictures), blocks are estimated from both past and future reference blocks. See, *Coding of Moving and Associated Audio. Committee Draft of Standard* ISO11172, ISO/MPEG 90/176, December 1990; *Video Codec for Audio Visual Services at px64 Kbits/s*, CCITT Recommendation H.261, 1990; and D. le Gall, *MPEG: A Video Compression Standard for Multimedia Applications*, Commun. of the ACM, Vol. 34, No. 4, pp. 47–58, April 1991. For the sake of simplicity, assume that only the past is used (e.g. P-pictures), and the extension is straightforward.

The best matching reference block x̂ may not be aligned to the original 8×8 blocks of the reference picture. In general, the reference block may intersect with four neighboring spatial domain blocks, henceforth denoted $x_1, x_2, x_3$, and $x_4$, that together form a 16×16 square, where $x_1$ corresponds to northwest, $x_2$ to northeast, $x_3$ to southwest, and $x_4$ to southeast.

The goal is to compute the DCT X of the current block x=x̂+e from the given DCT E of the prediction error e, and the DCT's $X_1, \ldots, X_4$ of $x_1, \ldots, x_4$, respectively. Because X=X̂+E, X̂ is the DCT of x̂, the main problem that remains is that of calculating X̂ directly from $X_1, \ldots, X_4$.

Let the intersection of the reference block x̂ with $x_1$ form an h×w rectangle (i.e. having h rows and w columns), where $1 \leq h \leq 8$ and $1 \leq w \leq 8$. This means that the intersections of x̂ with $x_2, x_3$, and $x_4$ are rectangles of sizes h×(8−w), (8−h)×w, and (8−h)×(8−w), respectively.

Following Chang and Messerschmitt ibid., it is readily seen that x̂ can be expressed as a superpositon of appropriate windowed and shifted versions of $x_1, \ldots, x_4$, i.e.

$$\hat{x} = \sum_{i=1}^{4} c_{i1} x_i c_{i2} \quad (56)$$

where $c_{i,j}$, i=1,...,4, j=1,2, are sparse 8×8 matrices of zeroes and ones that perform window and shift operations accordingly. The basic idea behind the work of Chang and Messerschmitt ibid. is to use the distributive property of matrix multiplication with respect to the DCT. Specifically, because $S^tS=I$, Equation 56 may be rewritten $$\hat{x} = \sum_{i=1}^{4} c_{i1} S^t S x_i S^t S c_{i2} \quad (57)$$

Next, by premultiplying both sides of Equation 57 by S, and postmultiplying by $S^t$, one obtains:

$$\hat{X} = \sum_{i=1}^{4} C_{i1} X_i C_{i2} \quad (58)$$

where $C_{ij}$ is the DCT of $c_{ij}$. Chang and Messerscmitt ibid. proposed to precompute the fixed matrices $C_{ij}$ for every possible combination of w and h, and to compute X̂ directly in the DCT domain using Equation 58. Although most of the matrices $C_{ij}$ are not sparse, computations can still be saved on the basis of typical sparseness of $\{X_i\}$, and due to the fact the reference block might be aligned in one direction, i.e. either w=8 or h=8, which means; that the right-hand side of Equation 58 contains two terms only; or in both directions w=h=8, in which case x̂=$x_1$ and hence no computations at all are needed.

The computation of X̂ is performed here even more efficiently by using two main facts. First, some of the matrices $c_{ij}$ are equal to each other for every given w and h. Specifically, $$c_{11} = c_{21} = U_h \triangleq \begin{pmatrix} 0 & I_h \\ 0 & 0 \end{pmatrix}$$

$$c_{12} = c_{32} = L_w \triangleq \begin{pmatrix} 0 & 0 \\ I_w & 0 \end{pmatrix}$$

where $I_h$ and $I_w$ are identity matrices of dimension h×h and w×w, respectively. Similarly, $$c_{31} = c_{41} = L_{8-h},$$

and $$c_{22} = c_{42} U_{8-w}.$$

The second observation that helps in saving computations is that rather than fully precomputing $C_{ij}$, it is more efficient to leave these matrices factorized into relatively sparse matrices. In particular, the scheme herein also uses the above described factorization of S (see Equations 8 to 9).

The best way to use the two observations mentioned above is the following: First, we precompute the fixed matrices:

$$J_i \triangleq U_i (MA_1 A_2 A_3)^t, i=1,2,\ldots,8$$

and $$K_i \triangleq L_i (MA_1 A_2 A_3)^t, i=1,2,\ldots,8.$$

These matrices are very structured and therefore, premultiplication by $K_i$ or $J_i$ can be implemented very efficiently. Next, compute X̂ by using the expression:

$$\hat{X} = S \begin{bmatrix} J_h B_2^t B_1^t P^t D (X_1 DPB_1B_2J_w^t + X_2 DPB_1B_2K_{8-w}^t) + \\ K_{8-h}B_2^t B_1^t P^t D (X_3 DPB_1B_2J_w^t + X_4 DPB_1B_2K_{8-w}^t) \end{bmatrix} S^t \quad (59)$$

which can easily be obtained from Equation 57, or by its dual form:

$$\hat{X} = S \begin{bmatrix} (J_h B_2^t B_1^t P^t DX_1 + K_{8-h}B_2^t B_1^t P^t DX_3) DPB_1B_2J_w^t + \\ (J_h B_2^t B_1^t P^t DX_2 + K_{8-h}B_2^t B_1^t P^t DX_4) DPB_1B_2K_{8-w}^t \end{bmatrix} S^t; \quad (60)$$

depending on which one of these expressions requires less computations for the given w and h.

Figure 7:
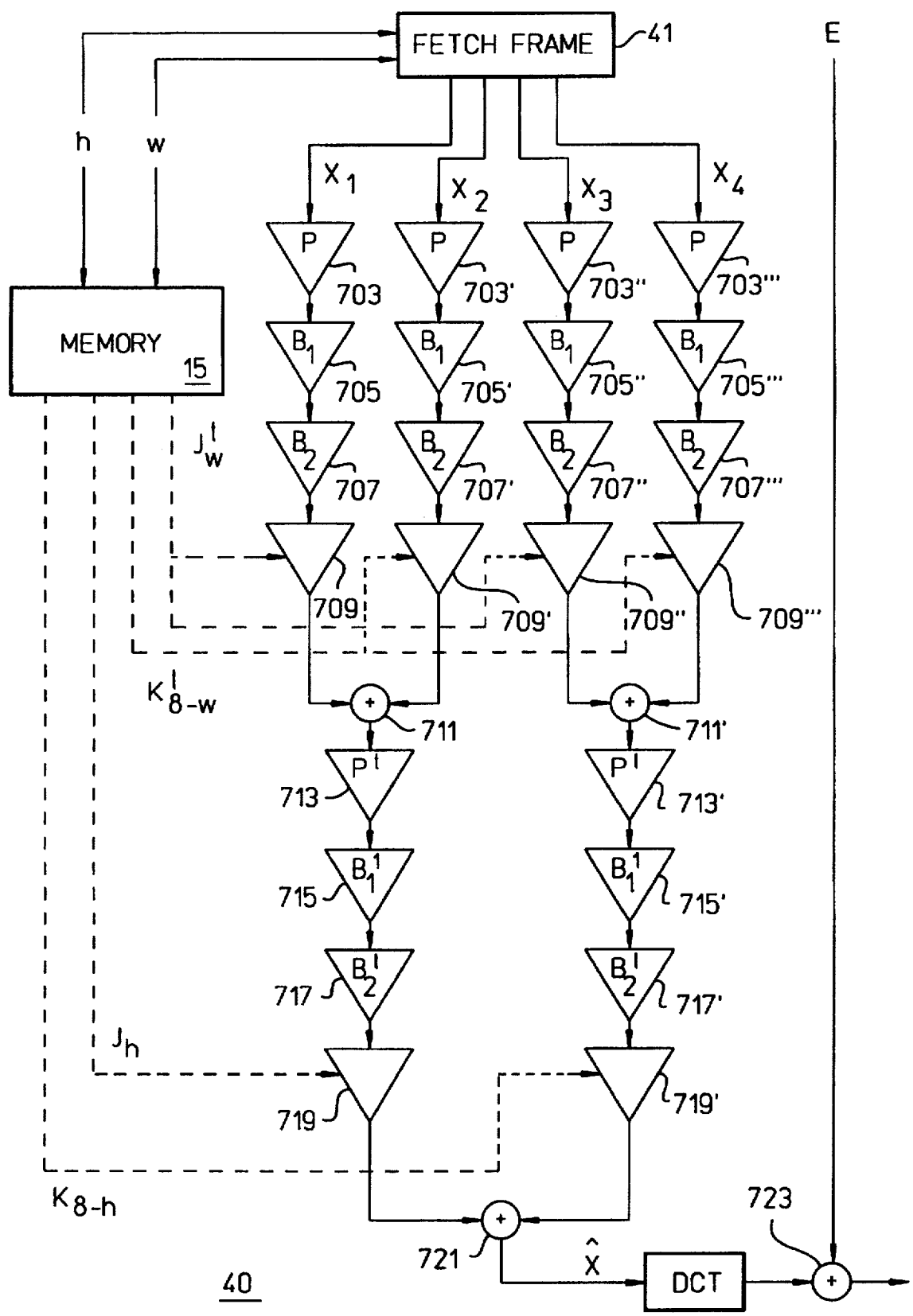
FIG. 7 is a block diagram of matrix arithmetic hardware for performing DCT based inverse motion compensation according to the present invention.

FIG. 7 is a block diagram of matrix arithmetic hardware for performing DCT based inverse motion compensation according to the present invention. As discussed above, a module 41 fetches the matrixes $X_1, X_2, X_3$, and $X_4$. Another module 36 fetches the motion vector h, w from the memory 15. The motion vectors are used to obtain the appropriate matrices $J_i$ and $K_i$ from the memory 15.

The matrices $X_1$ is each multiplied to the matrices P, $B_1$, $B_2$, and the matrix $J_w^t$ by matrix multipliers 703, 705, 707, 709; $X_2$ is each multiplied to the matrices P, $B_1$, $B_2$, and the matrix $J_w^t$ by matrix multipliers 703', 705', 707', 709'; $X_3$ is each multiplied to the matrices P, $B_1$, $B_2$, and the matrix $K_{8-w}^t$ by matrix multipliers 703", 705", 707", 709"; and $X_4$ is each multiplied to the matrices P, $B_1$, $B_2$, and the matrix $K_{8-w}^t$ by matrix multipliers 703''', 705''', 707''', 709'''. The result of these matrix multiplications quantities correspond to $$X_1 PB_1 B_2 J_w^t,$$

$X_2PB_1B_2K_{8-w}'$, $X_3PB_1B_2J_w'$, and $X_4PB_1B_2K_{8-w}'$ $X_1PB_1B_2$ and $X_2PB_1B_2$ are then added by adder 711, and $X_3PB_1B_2$ and $X_3PB_1B_2$ are then added by adder 711'. The results from 711 and 711' are then multiplied by the matrices $P^tB_1{}^tB_2{}^t$ by matrix multipliers 713, 715, 717, and 713', 715', 717', respectively. The output from matrix multiplier 717 is then multiplied to matrix $J_h$ by matrix multiplier 719, and the output from matrix multiplier 717' is multiplied to $K_{8-h}$ by matrix multiplier 719'. The output matrixes from matrix multipliers 719 and 719' are then added by matrix adder 721 to produce the output DCT $\hat{X}$. $\hat{X}$ Is finally added by matrix adder 723, to E to produce the desired result X.

In one embodiment the processing unit 40 is realized using hardware matrix multipliers and adders. In an alternative embodiment the matrix manipulations illustrated in FIG. 6 are implemented in software and carried out on a general purpose computer. Other alternatives include programmable logic devices and firmware.

The following demonstrates how to implement fast multiplication by $J_i$ and $K_i$. As an example, consider $J_6$. The other matrices are handled in a similar fashion. The matrix $J_6$ is the following:

$$J_6 = \begin{pmatrix} 1 & -1 & -a & 0 & b & a & c & 0 \\ 1 & 1 & -a & -1 & b & 0 & c & 0 \\ 1 & 1 & -a & -1 & -b & 0 & -c & 0 \\ 1 & -1 & -a & 0 & -b & -a & -c & 0 \\ 1 & -1 & a & 0 & c & -a & -b & 0 \\ 1 & 1 & a & 1 & c & 0 & -b & -1 \\ 0 & 0 & 0 & 0 & 0 & 0 & 0 & 0 \\ 0 & 0 & 0 & 0 & 0 & 0 & 0 & 0 \end{pmatrix}$$

where a=0.7071, b=0.9239, and c=0.3827. To compute $u=J_6v$, where $u=(u_1, \ldots, u_8)^t$ and $v=(v_1, \ldots, v_8)^t$, calculate according to the following steps:

$y_1 = v_1 + v_2$ (61)

$y_2 = v_1 - v_2$ (62)

$y_3 = av_3$ (63)

$y_4 = av_6$ (64)

$y_5 = y_1 - y_3$ (65)

$y_6 = y_5 - v_4$ (66)

$y_7 = y_3 - y_4$ (67)

$y_8 = y_3 + y_4$ (68)

$y_9 = (b+c)(v_5 + v_7)$ (69)

$y_{10} = cv_5$ (70)

$y_{11} = bv_7$ (71)

$y_{12} = y_9 - y_{10} - y_{11}$ (72)

$y_{13} = y_{10} - y_{11}$ (73)

$u_1 = y_2 - y_7 + y_{12}$ (74)

$u_2 = y_6 + y_{12}$ (75)

$u_3 = y_6 - y_{12}$ (76)

$u_4 = y_2 - y_8 - y_{12}$ (77)

$u_5 = y_2 + y_7 + y_{13}$ (78)

$u_6 = y_1 + y_3 + v_4 + y_{13} - v_8$ (79)

$u_7 = 0$ (80)

$u_8 = 0$ (81)

This implementation requires 5 multiplications and 22 additions.

By developing similar implementation schemes of matrix multiplication for all matrices $J_1, \ldots, J_8$, it can be seen that the numbers $\{N_i\}$ of operations required to multiply by $\{J_i\}$, $1 \leq i \leq 8$, are given by $N_1=18$, $N_2=24$, $N_3=38$, $N_4=39$, $N_5=40$, $N_6$43, $N_7$44, and $N_8=46$. Because the matrix $K_i$ has a structure similar to that of $J_i$ for every $1 \leq i \leq 8$, multiplication by $K_i$ costs also $N_i$ operations.

Again, when counting the operations in the implementation of Equations 59 or 60, multiplications by D and $D^{-1}$ can be ignored because these can be absorbed in the MPEG quantizer and dequantizer, respectively. The matrices P and $P^{-1}$ cause only changes in the order of the components so they can be ignored as well.

Thus, for a general position reference block, i.e. $1 \leq w \leq 7$, $1 \leq h \leq 7$, the following is obtained:

1. Six multiplications by $B_1$ or $B_1{}^t$: 6×32=192 operations.
2. Six multiplications by $B_2$ or $B_2{}^t$: 6×32=192 operations.
3. Two multiplications by $J_w$ and $K_{8-w}$, and one by $J_h$ and $K_{8-h}$, or vice versa: $8 \times (N_h + N_{8-h} + N_w + N_{8-w} + \min\{N_h + N_{8-h}, N_w + N_{8-w}\})$ operations.
4. One 2D-DCT: 42×16=672 operations.

Total: $1056 + 8 \times (N_h + N_{8-h} + N_w + N_{8-w} + \min\{N_h + N_{8-h}, N_w + N_{8-w}\})$ operations.

Note that additions of the products in Equations 59 and 60 are not counted because the different summands are nonzero on disjoint subsets of indices of matrix elements. When the reference block is aligned in the vertical direction only, i.e. h=8 and $1 \leq w \leq 7$, then $K_{8-h} = K_0 = L_0(MA_1A_2A_3)^t = 0$, and therefore Equations 59 and 60 contain two terms only. Furthermore, because $J_h = J_8 = U_8(MA_1A_2A_3)^t = (MA_1A_2A_3)^t$, Equation 66 degenerates to:

$\hat{X} = (X_1 DPB_1 B_2 J_w' + X_2 DPB_1 B_2 J_{8-w}') S^t$ (82)

which requires the following steps:

1. Two multiplications by $B_1$: 2×32=64 operations
2. Two multiplications by $B_2$: 2×32=64 operations.
3. One multiplication by $J_w$ and one by $K_{8-w}$: $8(N_w + N_{8-w})$ operations.
4. One multiplication by $S^t$: 8×42=336 operations.

Total: $464 + 8(N_w + N_{8-w})$ operations.

Similarly, for the horizontally aligned case, where w=8 and $1 \leq h \leq 7$, the number of computations is $464 + 8(N_h + N_{8-h})$. As mentioned earlier, when w=h=8 no computations are required at all because $\hat{X} = X_1$ and hence is already given.

By using the above expressions, it can be seen that the number of computations for the worst case values of h and w is 2928 operations, and the average number, assuming a uniform distribution on the pairs $\{(w,h): 1 \leq w \leq 8, 1 \leq h \leq 8\}$, is 2300.5. On the other hand, the brute-force approach of performing IDCT to $X_1, \ldots, X_4$, cutting the appropriate reference block in the spatial domain, and transforming it back, requires a total 4320 operations. This means that the reduction in computational complexity, in comparison to the brute-force method, is 32% for the worst case and 46.8% for the average.

So far it has not been assumed that the input DCT matrices are sparse. Typically, a considerable percentage of the DCT blocks have only a few nonzero elements, normally, those corresponding to low spatial frequencies in both directions. For simplicity, a DCT block is considered sparse if only the top left 4×4 quadrant, corresponding to low frequencies, is nonzero.

The implementation of multiplication by $J_i$ and $K_i$, $1 \leq i \leq 8$, when $X_1, \ldots, X_4$ are assumed sparse in the above sense reduces the number of computations to $$672+8 \cdot (N'_w + N'_{8-w} + N'_h N'_{8-h})$$

for $1 \leq w \leq 7$ and $1 \leq h \leq 7$, $$336+4 \cdot (N'_w + N'_{8-w})$$

for $h=8$ and $1 \leq w \leq 7$, $$336+4 \cdot (N'_h + N'_{8-h})$$

for $w=8$ and $1 \leq h \leq 7$, and zero when $w=h=8$, where:

$$N'_1=15, N'_2 20, N'_3 26, N'_4 33, N'_5=36, N'_6=40, N'_7=41, \text{ and } N'_8 42.$$

This means that there are 1728 computations in the worst case and 1397.2 computations on the average, corresponding to reductions of 60% and 68%, respectively, compared to the brute force approach.

For comparison with earlier results, Chang and Messerschmitt ibid. have shown computation savings only if the DCT matrices are sparse enough and if a large percentage of the reference blocks are aligned at least in one direction. Specifically, these authors introduced three parameters: the reciprocal of the fraction of nonzero coefficients $\beta$, the fraction $\alpha_1$ of reference blocks aligned in one direction, and the fraction $\alpha_2$ of completely unaligned reference blocks.

Consider first the worst case situation in terms of block alignment, i.e. $\alpha_1=0$ and $\alpha_2=1$. The above definition of sparseness corresponds to $\beta=4$. Chang et al. provide exact formulas for the number multiplications and additions associated with their approach in terms of $\alpha_1$, $\alpha_2$, $\beta$ and the block size N (N=8 in MPEG). According to these formulae, 16 multiplications per pixel and 19 additions per pixel are required. To compare with generic microprocessor operations, assume that on the average every multiplication requires up to 4 SHIFTs and 3 ADDs, and that SHIFTs and ADDs can be performed simultaneously. This means that a conservative estimate of the total number of operations per block is $(16 \times 3+19) \times 64=4288$ operations, which is much larger than 1728 operations (see above) in the herein disclosed scheme under the same circumstances.

As another point of comparison, note that a uniform distribution over w and h herein corresponds to $\alpha_1=14/64=0.219$ and $\alpha_2=49/64=0.766$, which is more pessimistic than the upper curve in FIG. 5 of Chang et al. ibid., where $\alpha_1=0.2$ and $\alpha_2=0.1$. Nevertheless, for $\beta=1$, the scheme herein disclosed makes it possible speedup the computations by a factor of 4320/2300.5=1.87 compared to 0.6 in Chang et al. ibid., and for $\beta=4$ the speedup is 4320/1397.2=3.13 compared to approximately 2.0 in Chang et al. ibid. Furthermore, if it is assumed that $\alpha_1=0.2$ and $\alpha_2=0.1$, then it is possible to obtain speedup factors of 9.06 for $\beta=1$ and about 15 for $\beta=4$, which means an improvement by an order of magnitude compared to Chang et al. ibid.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method for downsampling image information in the compressed domain, where such information has been compressed in accordance with a discrete cosine transform (DCT) based compression scheme, the method comprising the steps of:

Huffman decoding a compressed bitstream to extract a plurality of N×N DCT-based data blocks;

processing n of said data blocks in accordance with at least one sampling matrix to extract a single N×N DCT-based data block, wherein n is determined by a desired downsampling factor, and wherein said single data block is a determined average of said N data blocks.

2. The method of claim 1, said processing step further comprising the step of:

using partially factorized operators.

3. The method of claim 1, said processing step further comprising the step of:

determining X, a DCT of an N×N vector x, from at least two N-dimensional vectors $X_1$ and $X_2$, where X has a plurality of components, each of which is an average of related components in $x_1$ and $x_2$, where $x_1 = S_{-1} X_1$ and $x_2 = S^{-1} X_2$, and where S is an N-point DCT matrix.

4. The method of claim 3, said determining step further comprising the steps of:

performing a one-dimensional decimation by a factor of two in accordance with the relationship:

$$X = \frac{1}{2}(U_1 X_1 + U_2 X_2) = \frac{1}{4}[(U_1 + U_2)(X_1 + X_2) +$$

$$(U_1 - U_2)(X_1 - X_2)] = \frac{1}{4} DPB_1 B_2 [F_+ B_2^{-1} B_1^{-1} P^{-1} D^{-1}(X_1 + X_2) +$$

$$F_- B_2^{-1} B_1^{-1} P^{-1} D^{-1}(X_1 - X_2)]$$

where $Q_1$ and $Q_2$ are N×N DCT-based matrices;

where matrices $U_1 = SQ_1 S^{-1}$ and $U_2 = SQ_2 S^{-1}$;

where a factorization S is represented as follows:

$$S = DPB_1 B_2 MA_1 A_2 A_3,$$

where D is a fixed diagonal matrix, where P is a fixed permutation matrix;

where $B_1 B_2 MA_1 A_2 A_3$ are N×N fixed matrices; and where products:

$$F_i = MA_1 A_2 A_3 Q_i A_3^{-1} A_2^{-1} A_1^{-1} M^{-1} \quad i=1,2$$

are sparse matrices, said matrix having a sum $F_+ = F_1 + F_2$ and a difference $F_- = F_1 - F_2$.

5. The method of claim 3, said determining step further comprising the steps of:

downsampling by a factor of two in accordance with the relationship:

$$X = \frac{1}{16}(U_+X_{++}U_+^t + U_-X_{+-}U_-^t + U_+X_{-+}U_-^t + U_+X_{-+}U_-^t)$$

$$= \frac{1}{16} DPB_1B_2 \cdot$$

$$\begin{bmatrix} (F_+B_2^{-1}B_1^{-1}P^{-1}D^{-1}X_{+++} + F_-B_2^{-1}B_1^{-1}P^{-1}D^{-1}X_{+--})D^{-t}P^{-t}B_1^{t}B_2^{t}F_+^{t} + \\ (F_+B_2^{-1}B_1^{-1}P^{-1}D^{-1}X_{-+-} + F_-B_2^{-1}B_1^{-1}P^{-1}D^{-1}X_{--+})D^{-t}P^{-t}B_1^{t}B_2^{t}F_-^{t} \end{bmatrix}$$

$$B_2^{t}B_1^{t}P^{t}D^{t}.$$

where $Q_1$ and $Q_2$ are N×N DCT-based matrices;
where matrices $U_1 = SQ_1S^{-1}$ and $U_2 = SQ_2S^{-1}$;
where a factorization S is represented as follows:

$$S = DPB_1B_2MA_1A_2A_3,$$

where D is a fixed diagonal matrix,
where P is a fixed permutation matrix;
where $B_1B_2MA_1A_2A_3$ are N×N fixed matrices; and
where products:

$$F_i = MA_1A_2A_3Q_iA_3^{-1}A_2^{-1}A_1^{-1}M^{-1} \quad i=1,2$$

are sparse matrices, said matrix having a sum $F_+ = F_1 + F_2$ and a difference $F_- = F_1 - F_2$.

6. The method of claim 3, said determining step further comprising the steps of:

downsampling by a factor of four in accordance with the relationship:

$$X = \frac{1}{256} DPB_1B_2 \cdot$$

$$\begin{bmatrix} H_{+++}B_2^{-1}B_1^{-1}P^{-1}D^{-1} \cdot \\ \begin{pmatrix} X_{+++}^{+++}D^{-t}P^{-t}B_1^{t}B_2^{t}H_{+++}^{t} + X_{+++}^{++-}D^{-t}P^{-t}B_1^{t}B_2^{t}H_{++-}^{t} + \\ X_{+++}^{+-+}D^{-t}P^{-t}B_1^{t}B_2^{t}H_{+-+}^{t} + X_{+++}^{+--}D^{-t}P^{-t}B_1^{t}B_2^{t}H_{+--}^{t} \end{pmatrix} \\ + \\ H_{++-}B_2^{-1}B_1^{-1}P^{-1}D^{-1} \cdot \\ \begin{pmatrix} X_{++-}^{+++}D^{-t}P^{-t}B_1^{t}B_2^{t}H_{+++}^{t} + X_{++-}^{++-}D^{-t}P^{-t}B_1^{t}B_2^{t}H_{++-}^{t} + \\ X_{++-}^{+-+}D^{-t}P^{-t}B_1^{t}B_2^{t}H_{+-+}^{t} + X_{++-}^{+--}D^{-t}P^{-t}B_1^{t}B_2^{t}H_{+--}^{t} \end{pmatrix} \\ + \\ H_{+-+}B_2^{-1}B_1^{-1}P^{-1}D^{-1} \cdot \\ \begin{pmatrix} X_{+-+}^{+++}D^{-t}P^{-t}B_1^{t}B_2^{t}H_{+++}^{t} + X_{+-+}^{++-}D^{-t}P^{-t}B_1^{t}B_2^{t}H_{++-}^{t} + \\ X_{+-+}^{+-+}D^{-t}P^{-t}B_1^{t}B_2^{t}H_{+-+}^{t} + X_{+-+}^{+--}D^{-t}P^{-t}B_1^{t}B_2^{t}H_{+--}^{t} \end{pmatrix} \\ + \\ H_{+--}B_2^{-1}B_1^{-1}P^{-1}D^{-1} \cdot \\ \begin{pmatrix} X_{+--}^{+++}D^{-t}P^{-t}B_1^{t}B_2^{t}H_{+++}^{t} + X_{+--}^{++-}D^{-t}P^{-t}B_1^{t}B_2^{t}H_{++-}^{t} + \\ X_{+--}^{+-+}D^{-t}P^{-t}B_1^{t}B_2^{t}H_{+-+}^{t} + X_{+--}^{+--}D^{-t}P^{-t}B_1^{t}B_2^{t}H_{+--}^{t} \end{pmatrix} \end{bmatrix}$$

-continued $$B_2^{t}B_1^{t}P^{t}D^{t}$$

where $Q_1$ and $Q_2$ are N×N DCT-based matrices;
where matrices $U_1 = SQ_1S^{-1}$ and $U_2 = SQ_2S^{-1}$;
where a factorization S is represented as follows:

$$S = DPB_1B_2MA_1A_2A_3,$$

where D is a fixed diagonal matrix,
where P is a fixed permutation matrix;
where $B_1B_2MA_1A_2A_3$ are N×N fixed matrices; and
where products:

$$F_i = MA_1A_2A_3Q_iA_3^{-1}A_2^{-1}A_1^{-1}M^{-1} \quad i=1,2$$

are sparse matrices, said matrix having a sum $F_+ = F_1 + F_2$ and a difference $F_- = F_1 - F_2$.

7. The method of claim 3, said determining step further comprising the steps of:

downsampling by a factor of three in accordance with the relationship:

$$X = DPB_1B_2 \cdot \begin{bmatrix} TB_2^{-1}B_1^{-1}P^{-1}D^{-1} \\ (X_1'D^{-t}P^{-t}B_1^tB_2^tT' + X_2'D^{-t}P^{-t}B_1^tB_2^tT_+^t + X_3'D^{-t}P^{-t}B_1^tB_2^tT_-^t) + \\ T_+B_2^{-1}B_1^{-1}P^{-1}D^{-1} \\ (X_4'D^{-t}P^{-t}B_1^tB_2^tT' + X_5'D^{-t}P^{-t}B_1^tB_2^tT_+^t + X_5'D^{-t}P^{-t}B_1^tB_2^tT_-^t) + \\ T_-B_2^{-1}B_1^{-1}P^{-1}D^{-1} \\ (X_7'D^{-t}P^{-t}B_1^tB_1^tT' + X_8'D^{-t}P^{-t}B_1^tB_2^tT_+^t + X_9'D^{-t}P^{-t}B_1^tB_2^tT_-^t) \end{bmatrix} \cdot B_2^tB_1^tP^tD^t$$

based on the fact that the matrices:

$T = T_1 + T_2 + T_3,$ $T_+ = T_1 + T_3,$ $T_- = (T_1 - T_3)/2$ are relatively sparse, and on the identity:

$$T_1 X + T_2 Y + T_3 Z = TY + T_+ \left( \frac{X+Z}{2} - Y \right) + T_-(X-Z),$$

where D is a fixed diagonal matrix,
where P is a fixed permutation matrix; and
where $B_1 B_2 M A_1 A_2 A_3$ are fixed N×N matrices.

8. The method of claim 7, where:

$X_1 = X_5;$ $X_2 = \frac{1}{2}(X_4 + X_6) - X_5;$ $X_3 = X_4 - X_6;$ $X_4 = \frac{1}{2}(X_2 + X_8) - X_5;$ $X_5 = \frac{1}{2}\left[\left(\frac{X_1 + X_7}{2} - X_4\right) + \left(\frac{X_3 + X_9}{2} - X_6\right)\right] - X_4;$ $X_6 = \left(\frac{X_1 + X_7}{2} - X_4\right) - \left(\frac{X_3 + X_9}{2} - X_6\right);$ $X_7 = X_3 - X_8;$ $X_8 = \frac{1}{2}(X_1 - X_7 + X_3 - X_9) - X_7;$ and $X_9 = X_1 - X_7 - X_3 + X_9.$ 9. A method for achieving inverse motion compensation in the compressed domain, where such information has been compressed in accordance with a discrete cosine transform (DCT) based compression scheme, the method comprising the steps of:

Huffman decoding a compressed bitstream to extract a plurality of N×N DCT-based data blocks defining a picture T−1, and to extract a motion vector h,w;

processing n of said data blocks in accordance with at least one sampling matrix and with said motion vector to produce a single N×N DCT-based data block corresponding to a picture T, wherein n is used to define a region occupied by said picture T−1, and wherein said single data block is a combination of a data block consisting of a determined average of said n data blocks.

10. The method of claim 9, said processing step further comprising the step of:
using partially factorized operators.

11. The method of claim 9, said processing step further comprising the step of:
determining a DCT X of a current block x=x+e from a given DCT E of a prediction error e of the current block, and DCTs $X_1, \ldots, X_4$ of $x_1, \ldots, x_4$ respectively, where $X = \hat{X} + E$, and $\hat{X}$ is a DCT of x, such that $\hat{X}$ is determined directly from $X_1, \ldots, X_4$.

12. The method of claim 9, further comprising the step of:
precomputing fixed matrices:

$J \underline{A} U_i (MA_1 A_2 A_3)^t, i=1,2,\ldots,8$ and $K \underline{A} L_i (MA_1 A_2 A_3)^t, i=1,2,\ldots,8,$ where $Q_1$ and $Q_2$ are N×N DCT-based matrices;
where matrices $U_i = SQ_1 S^{-1}$ and $K_i = SQ_2 S^{-1}$;
where a factorization S is represented as follows:

$S = DPB_1 B_2 MA_1 A_2 A_3,$ where D is a fixed diagonal matrix,
where P is a fixed permutation matrix; and
where $B_1 B_2 MA_1 A_2 A_3$ are fixed N×N matrices.

13. The method of claim 12, further comprising the step of:
determining $\hat{X}$ in accordance with:

$$\hat{X} = S \begin{bmatrix} J_h B_2^t B_1^t P^t D(X_1 DPB_1 B_2 J_w^t + X_2 DPB_1 B_2 K_{8-w}^t t) + \\ K_{8-h} B_2^t B_1^t P^t D(X_3 DPB_1 B_2 J_w^t + X_4 DPB_1 B_2 K_{8-w}^t) \end{bmatrix} S^t.$$

14. The method of claim 12, further comprising the step of:
determining $\hat{X}$ in accordance with:

$$\hat{X} = S \begin{bmatrix} (J_h B_2^t B_1^t P^t D X_1 + K_{h-8} B_2^t B_1^t P^t D X_3) DPB_1 B_2 J_w^t + \\ (J_h B_2^t B_1^t P^t D X_2 + K_{h-8} B_2^t B_1^t P^t D X_4) DPB_1 B_2 K_{8-w}^t \end{bmatrix} S^t.$$

15. The method of claim 12, further comprising the step of:
determining $\hat{X}$ in accordance with:

$\hat{X} = (X_1 DPB_1 B_2 J_w^t + X_2 DPB_1 B_2 J_{8-w}^t) S^t.$

16. An apparatus for downsampling image information in the compressed domain, where such information has been compressed in accordance with a discrete cosine transform (DCT) based compression scheme, the apparatus comprising:

a Huffman decoder for decoding a compressed bitstream to extract a plurality of N×N DCT-based data blocks;

a processor for processing n of said data blocks in accordance with at least one sampling matrix to produce a single N×N DCT-based data block, wherein n is determined by a desired downsampling factor, and wherein said single data block is a determined average of said n data blocks.

17. The apparatus of claim 16, said processor further comprising:

means for using partially factorized operators.

18. The apparatus of claim 16, said processing further comprising:

means for determining X, a DCT of an N×N vector x, from at least two N-dimensional vectors $X_1$ and $X_2$, where X has a plurality of components, each of which is an average of related components in $x_1$ and $x_2$, where $x_1 = S^{-1}X_1$ and $x_2 = S^{-1}X_2$, and where S is an N-point DCT matrix.

19. The apparatus of claim 18, said means for determining further comprising:

means for performing a one-dimensional decimation by a factor of two in accordance with the relationship:

$$X = \frac{1}{2}(U_1X_1 + U_2X_2) =$$

$$\frac{1}{4}[(U_1 + U_2)(X_1 + X_2) + (U_1 - U_2)(X_1 - X_2)] =$$

$$\frac{1}{4} DPB_1B_2[F_+B_2^{-1}B_1^{-1}P^{-1}D^{-1}(X_1 + X_2) +$$

$$F_-B_2^{-1}B_1^{-1}P^{1}D^{-1}(X_1 - X_2)]$$

where $Q_1$ and $Q_2$ are N×N DCT-based matrices;
where matrices $U_1 = SQ_1S^{-1}$ and $U_2 = SQ_2S^{-1}$;
where a factorization S is represented as follows:

$S = DPB_1B_2MA_1A_2A_3$, where D is a diagonal matrix,
where P is a permutation matrix;
where $B_1B_2MA_1A_2A_3$ are N×N matrices; and
where products:

$F_i = MA_1A_2A_3Q_iA_3^{-1}A_2^{-1}A_1^{-1}M^{-1}$ $i=1,2$ are sparse matrices, said matrix having a sum $F_+ = F_1 + F_2$ and a difference $F_- = F_1 - F_2$.

20. The apparatus of claim 18, said means for determining further comprising:

means for downsampling by a factor of two in accordance with the relationship:

$$X = \frac{1}{16}(U_+X_{++}U_+^t + U_-X_{+-}U_+^t + U_+X_{-+}U_-^t + U_-X_{--}U_-^t)$$

$$= \frac{1}{16} DPB_1B_2 \cdot$$

$$\begin{bmatrix} (F_+B_2^{-1}B_1^{-1}P^{-1}D^{-1}X_{+++} + F_-B_2^{-1}B_1^{-1}P^{-1}D^{-1}X_{+--})D^{-t}P^{-t}B_1^{t}B_2^{t}F_+^t + \\ (F_+B_2^{-1}B_1^{-1}P^{-1}D^{-1}X_{-+} + F_-B_2^{-1}B_1^{-1}P^{-1}D^{-1}X_{--})D^{-t}P^{-t}B_1^{t}B_2^{t}F_-^t \end{bmatrix}$$

$B_2^{t}B_1^{t}P^{t}D^{t}$.

where $Q_1$ and $Q_2$ are N×N DCT-based matrices;
where matrices $U_1 = SQ_1S^{-1}$ and $U_2 = SQ_2S^{-1}$;

where a factorization S is represented as follows:

$S = DPB_1B_2MA_1A_2A_3$, where D is a fixed diagonal matrix,
where P is a fixed permutation matrix;
where $B_1B_2MA_1A_2A_3$ are N×N fixed matrices; and
where products:

$F_i = MA_1A_2A_3Q_iA_3^{-1}A_2^{-1}A_1^{-1}M^{-1}$ $i=1,2$ are sparse matrices, said matrix having a sum $F_+ = F_1 + F_2$ and a difference $F_- = F_1 - F_2$.

21. The apparatus of claim 18, said means for determining further comprising:

means for downsampling by a factor of four in accordance with the relationship:

$$X = \frac{1}{256} DPB_1B_2 \cdot$$

$$\begin{bmatrix} H_{+++}B_2^{-1}B_1^{-1}P^{-1}D^{-1} \cdot \\ \begin{pmatrix} X_{+++}^{+++}D^{-t}P^{-t}B_1^{t}B_2^{t}H_{+++}^{t} + X_{+++}^{--}D^{-t}P^{-t}B_1^{t}B_2^{t}H_{+--}^{t} + \\ X_{+++}^{-+}D^{-t}P^{-t}B_1^{t}B_2^{t}H_{-+}^{t} + X_{+++}^{+-}D^{-t}P^{-t}B_1^{t}B_2^{t}H_{-+-}^{t} \end{pmatrix} \\ + \\ H_{+--}B_2^{-1}B_1^{-1}P^{-1}D^{-1} \cdot \\ \begin{pmatrix} X_{+--}^{+++}D^{-t}P^{-t}B_1^{t}B_2^{t}H_{+++}^{t} + X_{+--}^{--}D^{-t}P^{-t}B_1^{t}B_2^{t}H_{+--}^{t} + \\ X_{+--}^{-+}D^{-t}P^{-t}B_1^{t}B_2^{t}H_{-+}^{t} + X_{+--}^{+-}D^{-t}P^{-t}B_1^{t}B_2^{t}H_{-+-}^{t} \end{pmatrix} \\ + \\ H_{-++}B_2^{-1}B_1^{-1}P^{-1}D^{-1} \cdot \\ \begin{pmatrix} X_{-++}^{+++}D^{-t}P^{-t}B_1^{t}B_2^{t}H_{+++}^{t} + X_{-++}^{--}D^{-t}P^{-t}B_1^{t}B_2^{t}H_{+--}^{t} + \\ X_{-++}^{-+}D^{-t}P^{-t}B_1^{t}B_2^{t}H_{-+}^{t} + X_{-++}^{+-}D^{-t}P^{-t}B_1^{t}B_2^{t}H_{-+-}^{t} \end{pmatrix} \\ + \\ H_{---}B_2^{-1}B_1^{-1}P^{-1}D^{-1} \cdot \\ \begin{pmatrix} X_{---}^{+++}D^{-t}P^{-t}B_1^{t}B_2^{t}H_{+++}^{t} + X_{---}^{--}D^{-t}P^{-t}B_1^{t}B_2^{t}H_{+--}^{t} + \\ X_{---}^{-+}D^{-t}P^{-t}B_1^{t}B_2^{t}H_{-+}^{t} + X_{---}^{+-}D^{-t}P^{-t}B_1^{t}B_2^{t}H_{-+-}^{t} \end{pmatrix} \end{bmatrix}$$

$B_2^{t}B_1^{t}P^{t}D^{t}$ where $Q_1$ and $Q_2$ are N×N DCT-based matrices;
where matrices $U_1 = SQ_1S^{-1}$ and $U_2 = SQ_2S^{-1}$;
where a factorization S is represented as follows:

$S = DPB_1B_2MA_1A_2A_3$, where D is a fixed diagonal matrix,
where P is a fixed permutation matrix;
where $B_1B_2MA_1A_2A_3$ are N×N fixed matrices; and
where products:

$F_i = MA_1A_2A_3Q_iA_3^{-1}A_2^{-1}A_1^{-1}M^{-1}$ $i=1,2$ are sparse matrices, said matrix having a sum $F_+ = F_1 + F_2$ and a difference $F_- = F_1 - F_2$.

22. The apparatus of claim 18, said means for determining further comprising:

means for downsampling by a factor of three in accordance with the relationship:

$$X = DPB_1B_2 \begin{bmatrix} TB_2^{-1}B_1^{-1}P^{-1}D^{-1} \\ (X_1D^{-t}P^{-t}B_1^tB_2^tT^t + X_2D^{-t}P^{-t}B_1^tB_2^tT_+^t + X_3D^{-t}P^{-t}B_1^tB_2^tT_-^t) + \\ T_+B_2^{-1}B_1^{-1}P^{-1}D^{-1} \\ (X_4D^{-t}P^{-t}B_1^tB_2^tT^t + X_5D^{-t}P^{-t}B_1^tB_2^tT_+^t + X_5D^{-t}P^{-t}B_1^tB_2^tT_-^t) + \\ T_-B_2^{-1}B_1^{-1}P^{-1}D^{-1} \\ (X_7D^{-t}P^{-t}B_1^tB_1^tT^t + X_8D^{-t}P^{-t}B_1^tB_2^tT_+^t + X_9D^{-t}P^{-t}B_1^tB_2^tT_-^t) \end{bmatrix} \cdot B_2^t B_1^t P^t D^t$$

based on the fact that the matrices:

$T = T_1 + T_2 + T_3,$ $T_+ = T_1 + T_3,$ $T_- = (T_1 - T_3)/2$ are relatively sparse, and on the identity:

$$T_1X + T_2Y + T_3Z = TY + T_+\left(\frac{X+Z}{2} - Y\right) + T_-(X-Z),$$

where D is a fixed diagonal matrix,
where P is a fixed permutation matrix; and
where $B_1 B_2 M A_1 A_2 A_3$ are N×N fixed matrices.

23. The apparatus of claim 22, where:

$X'_1 = X_5;$ $X'_2 = \frac{1}{2}(X_4 + X_6) - X_5;$ $X'_3 = X_4 - X_6;$ $X'_4 = \frac{1}{2}(X_2 + X_8) - X_5;$ $X'_5 = \frac{1}{2}\left[\left(\frac{X_1 + X_7}{2} - X_4\right) + \left(\frac{X_3 + X_9}{2} - X_6\right)\right] - X_4;$ $X'_6 = \left(\frac{X_1 + X_7}{2} - X_4\right) - \left(\frac{X_3 + X_9}{2} - X_6\right);$ $X'_7 = X_3 - X_8;$ $X'_8 = \frac{1}{2}(X_1 - X_7 + X_3 - X_9) - X_7;$ and $X'_9 = X_1 - X_7 - X_3 + X_9.$ 24. An apparatus for achieving inverse motion compensation in the compressed domain, where such information has been compressed in accordance with a discrete cosine transform (DCT) based compression scheme, the apparatus comprising:

a Huffman decoder for decoding a compressed bitstream to produce a plurality of N×N DCT-based data blocks defining a picture T−1 and to produce a motion vector h,w;

a processor processing n of said data blocks in accordance with at least one sampling matrix and with said motion vector to produce a single N×N DCT-based data block corresponding to a frame T, wherein n is used to define a region occupied by said frame T−1, and wherein said single data block is a combination of a data block consisting of a determined average of said n data blocks.

25. The apparatus of claim 24, said processor further comprising:

means for using partially factorized operators.

26. The apparatus of claim 24, said processor further comprising:

means for determining a DCT X of a current block x=x+e from a given DCT E of a prediction error e, and DCTs $X_1, \ldots, X_4$ of $x_1, \ldots, x_4$ respectively, where $X = \hat{X} + E$, and $\hat{X}$ is a DCT of x, such that $\hat{X}$ is determined directly from $X_1, \ldots, X_4$.

27. The apparatus of claim 26, further comprising:

means for precomputing fixed matrices:

$J_i \triangleq U_i(MA_1A_2A_3)^t, i=1,2,\ldots,8$ and $K_i \triangleq L_i(MA_1A_2A_3)^t, i=1,2,\ldots,8,$ where $Q_1$ and $Q_2$ are N×N DCT-based matrices;
where matrices $U_1 = SQ_1S^{-1}$ and $K_1 = SQ_2S^{-1}$;
where a factorization S is represented as follows:

$S = DPB_1B_2MA_1A_2A_3,$ where D is a fixed diagonal matrix,
where P is a fixed permutation matrix; and
where $B_1B_2MA_1A_2A_3$ are N×N fixed matrices.

28. The apparatus of claim 27, further comprising: means for determining $\hat{X}$ in accordance with:

$$\hat{X} = S\begin{bmatrix} J_hB_2^tB_1^tP^tD(X_1DPB_1B_2J_w^t + X_2DPB_1B_2K_{8-w}^t) + \\ K_{8-h}B_2^tB_1^tP^tD(X_3DPB_1B_2J_w^t + X_4DPB_1B_2K_{8-w}^t) \end{bmatrix} S^t.$$

29. The apparatus of claim 27, further comprising: means for determining $\hat{X}$ in accordance with:

$$\hat{X} = S\begin{bmatrix} (J_hB_2^tB_1^tP^tDX_1 + K_{h-8}B_2^tB_1^tP^tDX_3)DPB_1B_2J_w^t + \\ (J_hB_2^tB_1^tP^tDX_2 + K_{h-8}B_2^tB_1^tP^tDX_4)DPB_1B_2K_{8-w}^t \end{bmatrix} S^t.$$

30. The apparatus of claim 27, further comprising: means for determining $\hat{X}$ in accordance with:

$\hat{X} = (X_1DPB_1B_2J_w^t + X_2DPB_1B_2J_{8-w}^t)S^t.$

* * * * *